(12) United States Patent
Pilkington et al.

(10) Patent No.: US 12,419,350 B2
(45) Date of Patent: Sep. 23, 2025

(54) AEROSOL GENERATING APPARATUS HAVING A PUSH-PUSH MECHANISM

(71) Applicant: Imperial Tobacco Limited, Bristol (GB)

(72) Inventors: Matthew Pilkington, Liverpool (GB); Peter Lomas, Liverpool (GB); Molly McGuinness, Liverpool (GB)

(73) Assignee: Imperial Tobacco Limited, Bristol (GB)

( * ) Notice: Subject to any disclaimer, the term of this patent is extended or adjusted under 35 U.S.C. 154(b) by 419 days.

(21) Appl. No.: 17/930,786

(22) Filed: Sep. 9, 2022

(65) Prior Publication Data
US 2023/0081013 A1   Mar. 16, 2023

(30) Foreign Application Priority Data

Sep. 10, 2021  (EP) .................................. 21195894
Sep. 27, 2021  (EP) .................................. 21199156
Sep. 27, 2021  (EP) .................................. 21199164

(51) Int. Cl.
   *A24F 40/42*   (2020.01)
   *F16B 2/20*    (2006.01)

(52) U.S. Cl.
   CPC ............... *A24F 40/42* (2020.01); *F16B 2/20* (2013.01)

(58) Field of Classification Search
   CPC .......... A24F 40/10; A24F 40/40; A24F 40/42; A24F 40/70; F16B 2/20
   See application file for complete search history.

(56) References Cited

U.S. PATENT DOCUMENTS

| | | | |
|---|---|---|---|
| 10,986,870 B2 * | 4/2021 | Batista | A24F 40/42 |
| 11,559,082 B2 * | 1/2023 | Chen | A24F 40/46 |
| 2013/0037042 A1 * | 2/2013 | Hearn | A61M 15/06 141/18 |

(Continued)

FOREIGN PATENT DOCUMENTS

| | | |
|---|---|---|
| CA | 2 886 395 A1 | 7/2014 |
| EP | 3 232 837 A2 | 10/2017 |

(Continued)

OTHER PUBLICATIONS

European Extended Search Report (21199156.7-1004), dated Mar. 4, 2022, 11 pages.
European Extended Search Report (21195894.7-1004), dated Feb. 7, 2022, 7 pages.
European Extended Search Report (21199164.1-1014), dated Mar. 18, 2022, 12 pages. Ballerstedt Markus, "Herstellung von Dichtungen im 2-Komponenten-Spritzgussverfahren (2K-Verfahren)", Dichtung Und Wahrheit - Dichtungstechnik in Der Praxis, 9.

(Continued)

Primary Examiner — Abdullah A Riyami
Assistant Examiner — Thang H Nguyen
(74) Attorney, Agent, or Firm — DUNLAP CODDING, P.C.

(57) ABSTRACT

The present disclosure relates to an aerosol generating apparatus wherein a consumable is engaged with a body by pushing the consumable toward the body in a first direction, and wherein the consumable is disengaged from the body by subsequently pushing the consumable in the same first direction. Consequently, the consumable is fixed to the body by a mechanism that enables a relative movement of the consumable and body in a first, push direction, to engage the mechanism, and a second relative movement of the consumable and body in the first, push direction to disengage the mechanism. Thus, in the exemplary embodiments, the consumable is engaged to the body by a push-push mechanism.

10 Claims, 16 Drawing Sheets

(56) References Cited

U.S. PATENT DOCUMENTS

| | | | | |
|---|---|---|---|---|
| 2016/0331030 A1* | 11/2016 | Ampolini | ............ | A61M 11/042 |
| 2019/0110521 A1* | 4/2019 | Sears | ................ | B01F 23/2133 |
| 2019/0223510 A1 | 7/2019 | Bowen et al. | | |
| 2019/0364968 A1* | 12/2019 | Fu | ............................ | G08B 6/00 |
| 2020/0015519 A1* | 1/2020 | Conner | ................... | A24D 3/04 |
| 2021/0145050 A1* | 5/2021 | Ricketts | ................. | A24F 40/40 |

FOREIGN PATENT DOCUMENTS

| | | | | |
|---|---|---|---|---|
| EP | 3 714 712 A1 | 9/2020 | | |
| EP | 3 785 551 A1 | 3/2021 | | |
| EP | 3 799 742 A1 | 4/2021 | | |
| EP | 3 797 610 A1 | 3/2023 | | |
| GB | 2381050 A | 4/2003 | | |
| KR | 100736770 B1 | 7/2007 | | |
| WO | WO 2015/192326 A1 | 12/2015 | | |
| WO | WO-2019162504 A1 * | 8/2019 | .............. | A24D 1/20 |
| WO | WO 2019/202048 A1 | 10/2019 | | |
| WO | WO 2021/133851 A1 | 7/2021 | | |
| WO | WO 2021/152035 A1 | 8/2021 | | |

OTHER PUBLICATIONS

Ballerstedt Markus, "Herstellung von Dichtungen im 2-Komponenten-Spritzgussverfahren (2K-Verfahren)", Dichtung Und Wahrheit—Dichtungstechnik In Der Praxis, 9. Lubecker Werkstofftag, Dec. 8, 2017, pp. 1-24, XP055899368, Retrieved from the Internet: URL: <https://www.ihk-schleswig-holstein.de/bluepring/servlet/resource/blob/4507546/250e5d7901e90180d27e6a3e136c4220/ballerstedt-2k-spritzgussverfahren-data.pdf>.

Anonymous : "Two-Shot Molding Design Guide", Feb. 26, 2019 (Feb. 26, 2019), pp. 1-23, XP055899007, Retrieved from the Internet: URL: <https://geminigroup.net/two-shot-injection-molding-design-guide/>.

Anonymous: "Silikon- und Gummispritzguss in Kombination mit Thermoplasten", Osterreichische Kunststoffzeitschrift 3/4 2015, May 26, 2015 (May 26, 2015), pp. 1-4, XP055899342, Retrieved from the Internet: URL : <https://www.engelglobal.com/fileadmin/master/Downloads/Fachartikel/2015-03_OEKZ_ENGEL_Schneegans.pdf>.

* cited by examiner

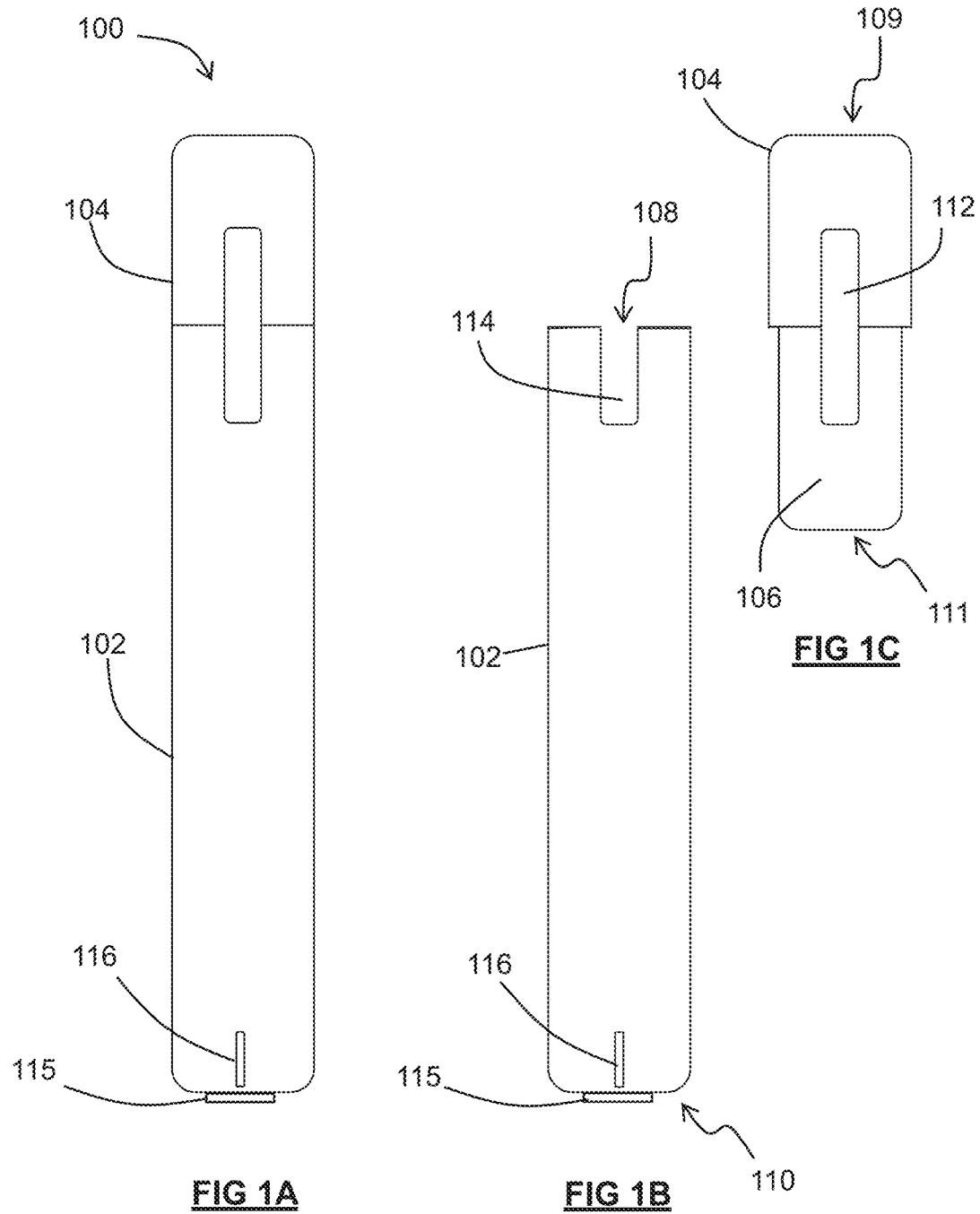

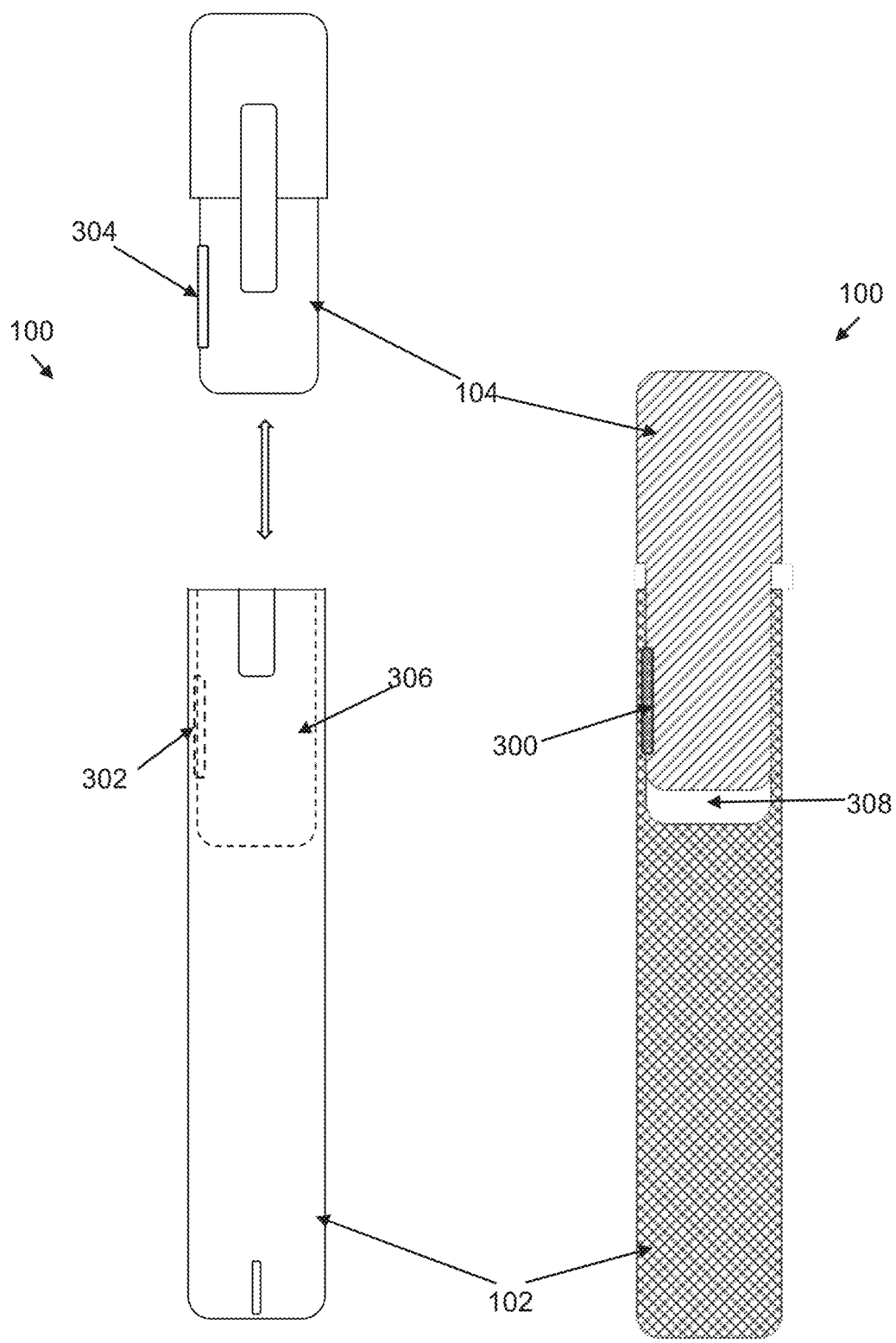

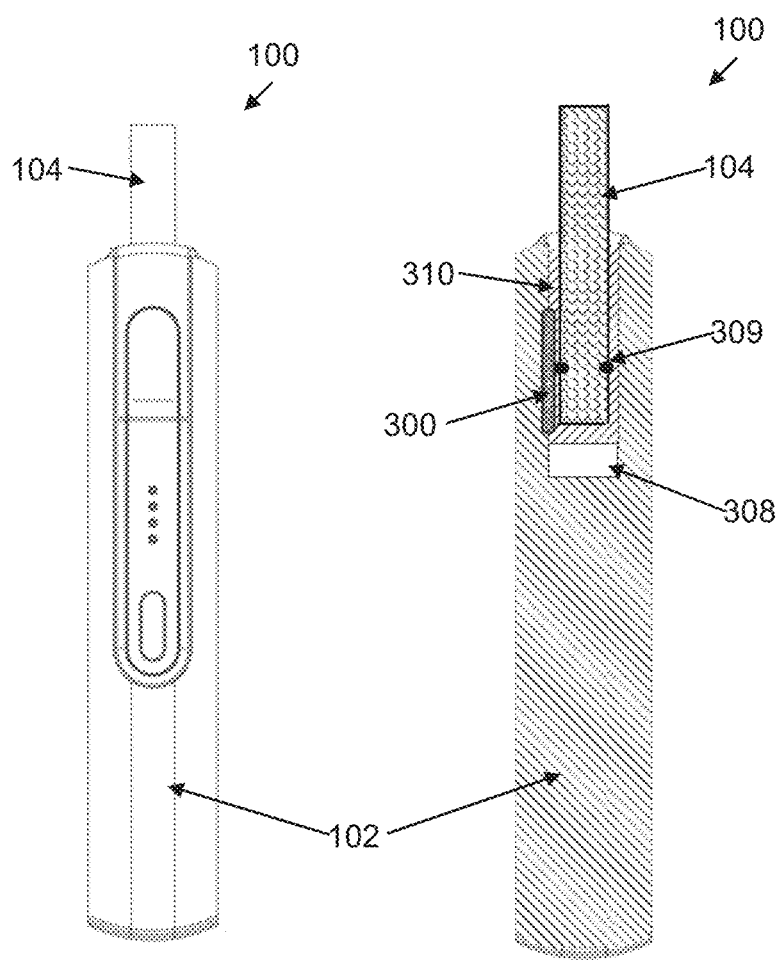

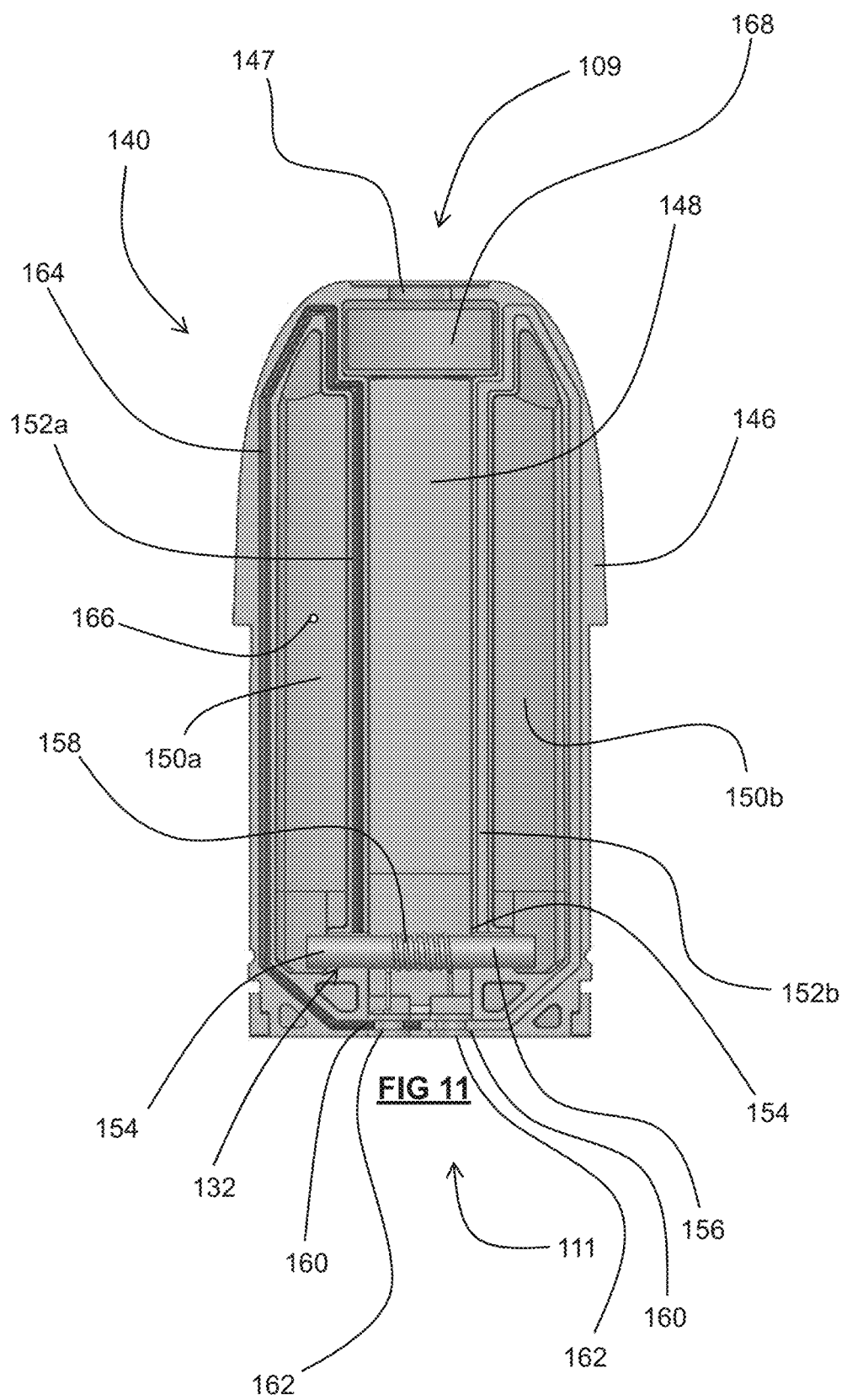

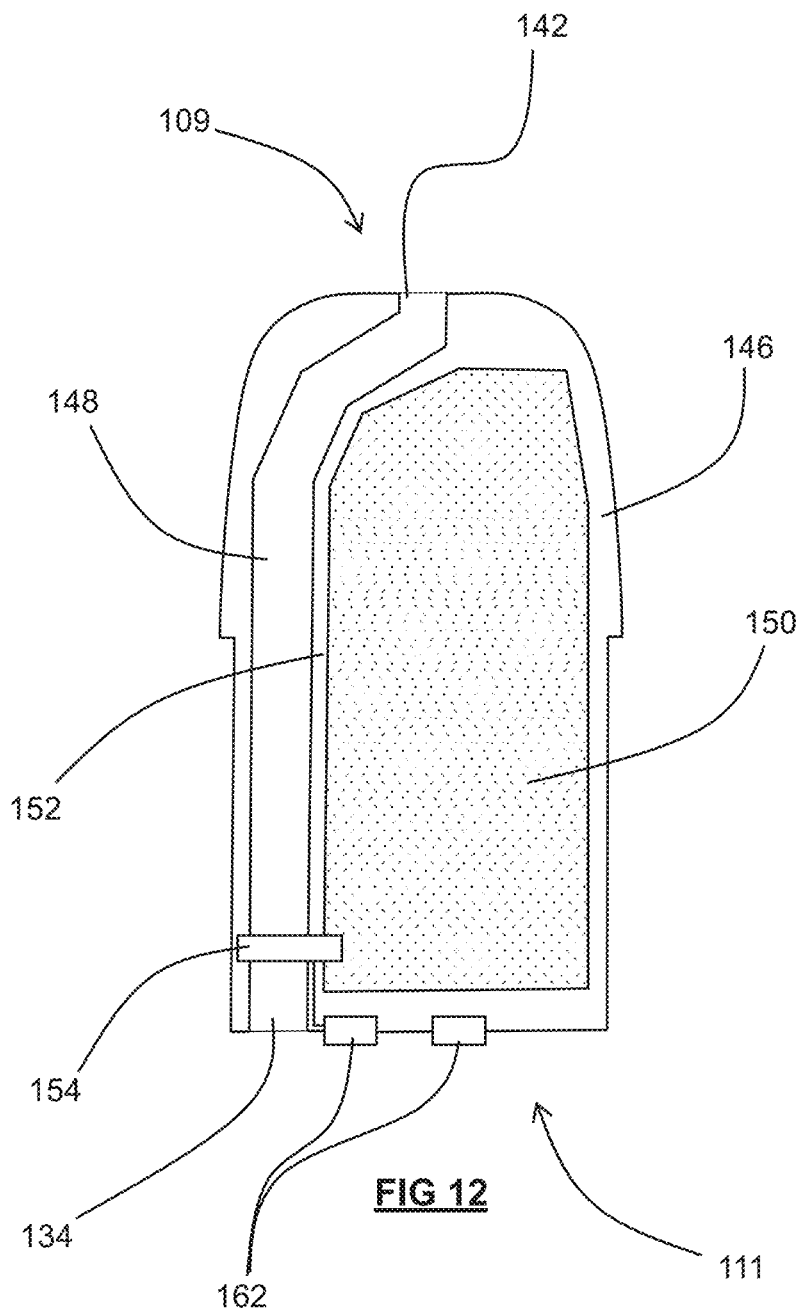

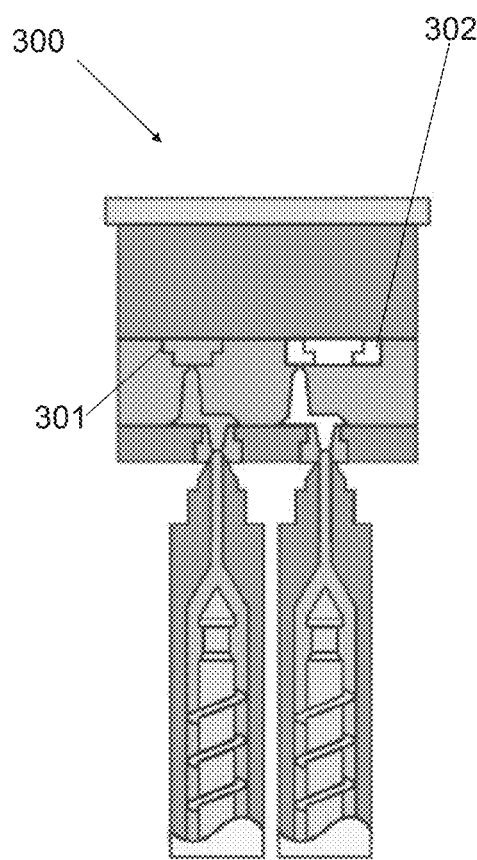
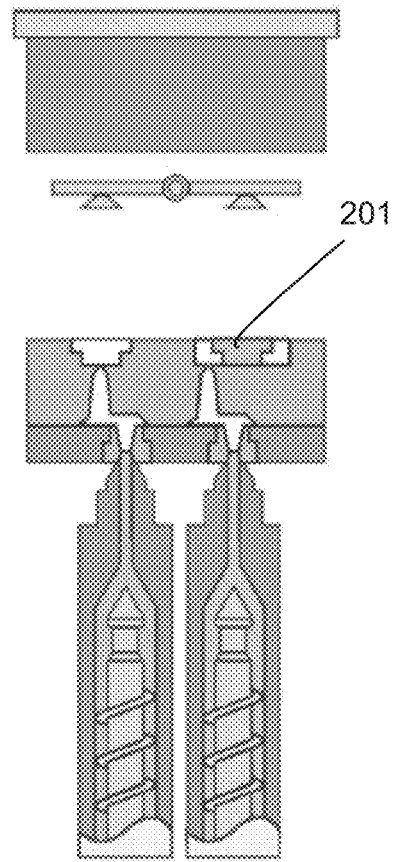
STEP 1
Press closed; first shot injected into first mold
FIG 13A
STEP 2
Press opened; part created from first shot is robotically transferred to second mold
FIG 13B

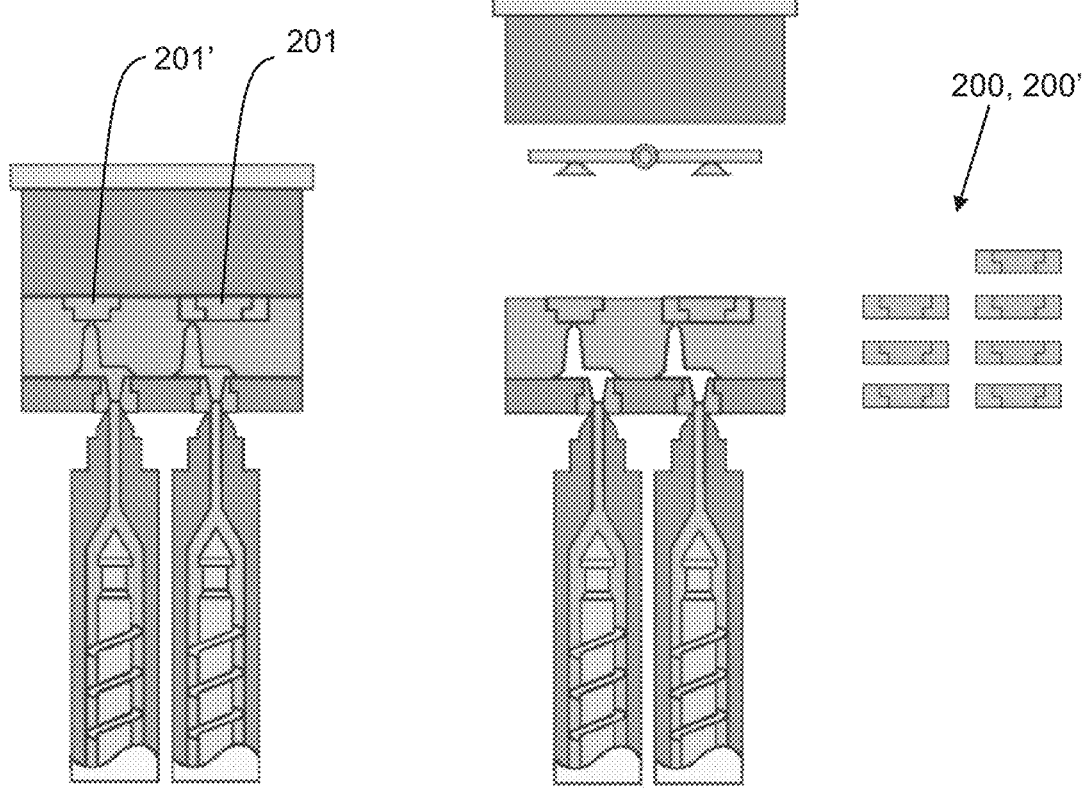

AEROSOL GENERATING APPARATUS HAVING A PUSH-PUSH MECHANISM

CROSS-REFERENCE TO RELATED APPLICATIONS/INCORPORATION BY REFERENCE STATEMENT

This application is a non-provisional application claiming benefit to EP 21195894.7 filed on Sep. 10, 2021, to EP 21199164.1 filed on Sep. 27, 2021, and to EP 21199156.7 filed on Sep. 27, 2021. The entire contents of each of the above-referenced applications are hereby incorporated herein by reference in their entirety.

TECHNICAL FIELD

The present disclosure relates to an aerosol generating apparatus and an aerosol generating system such as a smoking substitute apparatus/system. In particular, the disclosure relates to an aerosol generating apparatus wherein a consumable is engaged relative to a body.

The present disclosure also relates to a kit of parts and a method for forming an aerosol delivery component, and a component part forming part of the kit of parts.

The present disclosure relates to an aerosol delivery component and a method of manufacturing an aerosol delivery component such as a smoking substitute component.

BACKGROUND

The smoking of tobacco is generally considered to expose a smoker to potentially harmful substances. It is generally thought that a significant amount of the potentially harmful substances are generated through the heat caused by the burning and/or combustion of the tobacco and the constituents of the burnt tobacco in the tobacco smoke itself.

Combustion of organic material such as tobacco is known to produce tar and other potentially harmful by-products. There have been proposed various smoking substitute systems in order to avoid the smoking of tobacco.

Such smoking substitute systems can form part of nicotine replacement therapies aimed at people who wish to stop smoking and overcome a dependence on nicotine.

Smoking substitute systems, which may also be known as electronic nicotine delivery systems, may comprise electronic systems that permit a user to simulate the act of smoking by producing an aerosol, also referred to as a "vapour", which is drawn into the lungs through the mouth (inhaled) and then exhaled. The inhaled aerosol typically bears nicotine and/or flavourings without, or with fewer of, the odour and health risks associated with traditional smoking.

In general, smoking substitute systems are intended to provide a substitute for the rituals of smoking, whilst providing the user with a similar experience and satisfaction to those experienced with traditional smoking and tobacco products.

The popularity and use of smoking substitute systems has grown rapidly in the past few years. Although originally marketed as an aid to assist habitual smokers wishing to quit tobacco smoking, consumers are increasingly viewing smoking substitute systems as desirable lifestyle accessories. Some smoking substitute systems are designed to resemble a traditional cigarette and are cylindrical in form with a mouthpiece at one end. Other smoking substitute systems do not generally resemble a cigarette (for example, the smoking substitute device may have a generally box-like form).

There are a number of different categories of smoking substitute systems, each utilising a different smoking substitute approach. A smoking substitute approach corresponds to the manner in which the substitute system operates for a user.

One approach for a smoking substitute system is the so-called "vaping" approach, in which a vaporisable liquid, typically referred to (and referred to herein) as "e-liquid", is heated by a heater to produce an aerosol vapour which is inhaled by a user. An e-liquid typically includes a base liquid as well as nicotine and/or flavourings. The resulting vapour therefore typically contains nicotine and/or flavourings. The base liquid may include propylene glycol and/or vegetable glycerine.

A typical vaping smoking substitute system includes a mouthpiece, a power source (typically a battery), a tank or liquid reservoir for containing e-liquid, as well as a heater. In use, electrical energy is supplied from the power source to the heater, which heats the e-liquid to produce an aerosol (or "vapour") which is inhaled by a user through the mouthpiece.

Vaping smoking substitute systems can be configured in a variety of ways. For example, there are "closed system" vaping smoking substitute systems which typically have a heater and a sealed tank which is pre-filled with e-liquid and is not intended to be refilled by an end user. One subset of closed system vaping smoking substitute systems includes a device which includes the power source, wherein the device is configured to be physically and electrically coupled to a component including the tank and the heater. In this way, when the tank of a component has been emptied, the device can be reused by connecting it to a new component. Another subset of closed system vaping smoking substitute systems are completely disposable, and intended for one-use only.

There are also "open system" vaping smoking substitute systems which typically have a tank that is configured to be refilled by a user, so the system can be used multiple times.

An example vaping smoking substitute system is the Myblu™ e-cigarette. The Myblu™ e cigarette is a closed system which includes a device and a consumable component. The device and consumable component are physically and electrically coupled together by pushing the consumable component into the device. The device includes a rechargeable battery. The consumable component includes a mouthpiece, a sealed tank which contains e-liquid, as well as a vaporiser, which for this system is a heating filament coiled around a portion of a wick which is partially immersed in the e-liquid. The system is activated when a microprocessor on board the device detects a user inhaling through the mouthpiece. When the system is activated, electrical energy is supplied from the power source to the vaporiser, which heats e-liquid from the tank to produce a vapour which is inhaled by a user through the mouthpiece.

Known consumable components for smoking substitute systems can include many parts that must be assembled to form the consumable component. This presents issues with regards to the cost and time for producing these consumable components and, due to the complexity of such consumable components, they can be susceptible to leakage (e.g., through joins). Given consumable components form a disposable part of such systems it is especially desirable to minimise the cost of producing them.

The component typically includes a base portion which seals the tank and supports the vaporiser. Electrical contacts to connect the vaporiser to the battery in the device typically extend through the base portion. A gasket (e.g., an o-ring) surrounds the base portion to seal against the inner surfaces of the tank. The gasket/o-ring is currently manually fitted to the base portion after manufacture of the base portion. This is time-consuming and thus increases manufacturing costs. Furthermore, dislodgement of the gasket/o-ring during subsequent manufacturing steps can result in a faulty component prone to leakage of e-liquid from the tank around the base portion. Accordingly, there is a need for an improved method of manufacturing an aerosol delivery component.

Another example vaping smoking substitute system is the blu PRO™ e-cigarette. The blu PRO™ e cigarette is an open system which includes a device, a (refillable) tank, and a mouthpiece. The device and tank are physically and electrically coupled together by screwing one to the other. The mouthpiece and refillable tank are physically coupled together by screwing one into the other, and detaching the mouthpiece from the refillable tank allows the tank to be refilled with e-liquid. The system is activated by a button on the device. When the system is activated, electrical energy is supplied from the power source to a vaporiser, which heats e-liquid from the tank to produce a vapour which is inhaled by a user through the mouthpiece.

An alternative to the "vaping" approach is the so-called Heated Tobacco ("HT") approach in which tobacco (rather than an e-liquid) is heated or warmed to release vapour. HT is also known as "heat not burn" ("HNB"). The tobacco may be leaf tobacco or reconstituted tobacco. In the HT approach the intention is that the tobacco is heated but not burned, i.e., the tobacco does not undergo combustion.

The heating, as opposed to burning, of the tobacco material is believed to cause fewer, or smaller quantities, of the more harmful compounds ordinarily produced during smoking. Consequently, the HT approach may reduce the odour and/or health risks that can arise through the burning, combustion and pyrolytic degradation of tobacco.

A typical HT smoking substitute system may include a device and a consumable component. The consumable component may include the tobacco material. The device and consumable component may be configured to be physically coupled together. In use, heat may be imparted to the tobacco material by a heating element of the device, wherein airflow through the tobacco material causes components in the tobacco material to be released as vapour. A vapour may also be formed from a carrier in the tobacco material (this carrier may for example include propylene glycol and/or vegetable glycerine) and additionally volatile compounds released from the tobacco. The released vapour may be entrained in the airflow drawn through the tobacco.

As the vapour passes through the consumable component (entrained in the airflow) from the location of vaporization to an outlet of the component (e.g., a mouthpiece), the vapour cools and condenses to form an aerosol for inhalation by the user. The aerosol may contain nicotine and/or flavour compounds.

As consumer devices that are handled and used by consumers in everyday environments, it is advantageous for smoking substitute systems to be user friendly and to provide users with features and functionality to compliment or ancillary to the primary function of generating an inhalable vapour.

Accordingly, there is a need for an improved aerosol delivery device/system which addresses at least some of the problems of the known devices and systems.

SUMMARY

According to a first aspect, there is provided an aerosol generating apparatus (e.g., a smoking substitute apparatus) wherein a consumable is engaged with a body by pushing the consumable toward the body in a first direction, and wherein the consumable is disengaged from the body by subsequently pushing the consumable in the same first direction. Consequently, the consumable is fixed to the body by a mechanism that enables a relative movement of the consumable and body in a first, push direction, to engage the mechanism, and a second relative movement of the consumable and body in the first, push direction to disengage the mechanism. Thus, in the exemplary embodiments, the consumable is engaged to the body by a push-push mechanism.

Providing an aerosol generating apparatus wherein a consumable is engaged with a body by the engagement of a push-push mechanism, allows the consumable to be pushed relative to the body to engage the body and pushed again relative to the body to disengage the consumable and body. Once disengaged, the consumable is separated from the body and can be removed, but whilst engaged, the consumable is restricted from being separated from the body.

Advantageously, engaging a consumable with a body using a push-push mechanism provides an improved user experience. For instance, the push-push mechanism provides an improved lock between the consumable and body, where the risk of accidental removal is reduced. That is, a secondary push action, followed by a reverse pull action to remove the consumable from the body has a reduced likelihood of being accidentally replicated. In addition, a push-push mechanism provides an enhanced user experience as the push-push mechanism can be repeatedly actioned without the step of withdrawing the consumable from the body, providing the user with a fiddle factor.

In exemplary embodiments, a push-push mechanism comprises a push-push insertion member and a push-push receiving member. Suitably, the push-push mechanism is configured so that the push-push insertion member is captured by the push-push receiving member when the push-push insertion member is pushed towards the push-push receiving member and released when the members are moved relatively to each other in the same direction.

Suitably, one of the push-push insertion member or push-push receiving member is fixed or attached to the body and the other fixed or attached to a second member. In one exemplary embodiment, the second member is the consumable. For instance, the consumable may be a capsule or pod (e.g., an E-liquid consumable) and the second part may be integral or fixed or otherwise connected to a housing of the consumable. Alternatively, the second member may be a carrier that receives and moves with the consumable. For instance, the consumable may be a stick or package (e.g., a heat not burn consumable) and the carrier receives the consumable to move with the consumable. Here, the second part is integral or fixed or otherwise connected to the carrier. In the embodiments including a carrier, for instance where the consumable cannot be easily modified to include the push-push mechanism, the carrier suitably includes a gripping means. Here, the gripping means is configured to be actuatable to grip the consumable. For instance, the gripping means may comprise a gripping member that is moved between a free position (wherein the consumable can be received in the carrier by relative movement) and a restricted position, wherein the gripping member grips the consumable to restrict relative movement between the consumable and carrier. For instance, in the restricted position, the gripping member may restrict a volume of the carrier in which the consumable is received, such that the restriction acts to grip the consumable in the carrier. In the exemplary embodiments including a gripping member, the push-push insertion member is further configured to actuate the gripping means between the free and restricted positions as the push-push mechanism is disengaged and engaged respectively.

According to a second aspect, there is therefore provided an aerosol generating apparatus including a body and a consumable, wherein one of the body or a second member includes a push-push insertion member and the other of the body or second member includes a push-push receiving member, wherein the push-push insertion member is receivable by the push-push receiving member to engage the consumable with the body.

According to a third aspect, there is therefore provided a consumable suitable for use with a body in forming an aerosol generating apparatus, wherein the consumable includes one of a push-push insertion member or a push-push receiving member, and the respective member is configured so that the push-push insertion member is receivable by the push-push receiving member to engage the consumable to the body.

According to a fourth aspect, there is therefore provided a body suitable for use with a consumable in forming an aerosol generating apparatus, wherein the body includes one of a push-push insertion member or a push-push receiving member, and the respective member is configured so that the push-push insertion member is receivable by the push-push receiving member to engage the consumable to the body.

In exemplary embodiments, the body comprises a recess for receiving the consumable. The recess suitably has an elongate axis parallel to an elongate axis of the body. Here, the respective push-push insertion or receiving member may be arranged within the recess. Suitably, the respective push-push insertion or receiving member is arranged on an internal side wall of the recess. It will be appreciated that when the consumable is engaged with the body, at least a portion of the consumable may be spaced from a distal, closed end of the cavity. The spacing enabling the portion of the consumable to move further into the recess during the second push action to disengage the push-push mechanism. It is envisaged the consumable may be an integral unit that moves as a single part, where the entire distal end of the consumable is spaced from the distal closed end of the recess in the engaged position. In an alternative embodiment, where the arrangement of, for instance the heating unit (or other components of the aerosol deliver system) are not configured to allow respective movement to accommodate the second push action, the consumable may include a sleeve or the like that moves relative to other parts of the consumable in order to accommodate the movement associated with the second push action, without requiring relative movement of the other components of the consumable with respective components of the body.

In exemplary embodiments, the push-push mechanism causes the consumable to be engaged and disengaged from the body. Here, when engaged, the push-push mechanism restricts relative movement between the consumable and body. The relative movement is restricted in at least a second direction opposed to the first direction (i.e., a pull direction). Thus, the consumable may be considered locked to the body. In some embodiments, the push-push mechanism also prevents rotational movement (i.e., rotation of the consumable relative to the body) and/or translational movement relative to the first direction (i.e., sideways movement of the consumable relative to the body). However, it is envisaged rotational movement and/or translational movement of the consumable relative to the body may also be restricted by abutment between the consumable and body. For instance, where the consumable is inserted into a recess in the body, abutment between the recess and consumable might provide the restriction to relative translational movement. Furthermore, the recess and consumable may have cooperating alignment features, wherein the cooperating alignment features may provide the restriction to rotational movement. Here, the cooperating alignment features may assist the connection of the push-push mechanism, for instance, where a specific angular alignment is required between the consumable and body to engage the parts of the push-push mechanism. In some exemplary embodiments, the cooperating alignment features are a face or protrusion or the like providing one or both of the body and consumable with a non-rotationally symmetric cross-section. For instance, the cooperating features may be a facet on the consumable and a corresponding facet on the body (e.g., on the inner side surface of the recess), where the corresponding facets allow insertion of the consumable into the recess in a restricted number of rotational respective alignments. Here, the respective members of the push-push mechanism may be arranged on the facets.

In exemplary embodiments, the push-push mechanism includes a biasing means to bias the consumable to move in the second direction (i.e., the pull direction that is opposed to the push direction). Thus, the consumable is pushed against the bias of the biasing means during both the first push action and also the second push action. Advantageously, the biasing means assists in providing a secure engagement of the push-push mechanism. In some exemplary embodiments, the push-push mechanism comprises a push-push insertion member and a push-push receiving member. Here, the insertion member may comprise a follower. The follower being configured to enter and follow a track. Thus, the receiving member comprises a track for receiving and guiding the follower. The follower is moveably connected to a housing (the housing may be a separate part to the respective consumable or body or may be integral thereto). For instance, the follower may be formed on the end of an arm or the like wherein the arm is connected to the housing. The connection may be resilient so that when the arm is moved away from a natural position, it is biased back towards the natural position. Alternatively, the follower may be retained by the housing but otherwise free to move. Thus, in either instance, the follower is configured to move laterally relative to the push direction. Here, the track is configured to guide the follower at least partially in the first (push) direction and then to return the follower at least partially along the second (pull) direction in a different position, such that the follower is caused to abut or hook a part of the receiving member. That is, the track guides the follower along a first path during the initial push action of the consumable, and then guides the follower along a second path as the consumable withdraws (suitably under the presence of a biasing means) in the second, opposed (pull) direction. The first and second paths being different. The abutment between the follower and receiving member preventing further respective movement in the pull direction. Consequently, the insertion member is captured by the receiving member by guiding the follower from the first path to the second path. It will be appreciated that the track guides the follower to return along a different path to the path taken during the push action. As explained to release the follower form the receiving member, the follower is caused to move at least partially in the first (push) direction. Here, the track guides the follower to follow a third path (which may be the reverse of the second path), before returning down a fourth path during relative movement of the consumable and body in the opposed second (pull) direction. The fourth path may be the reverse of the first path. In the exemplary embodiments including a biasing means, the biasing means biases the follower to move along the second and fourth paths. The receiving member may include a projection of the like to guide the follower between the first and second paths and between the third and fourth paths. The projection may be in addition to or an alternative to any resiliency in the connection of the follower to the housing. For instance, the projection might be a diverting feature that diverts the follower to take a different path when moved past the diverting feature in one direction than the other.

In exemplary embodiments the aerosol generating apparatus includes a power supply, for supply of electrical energy. Suitably, the aerosol generating apparatus includes an aerosol generating unit that is driven by the power supply. The power supply may include an electric power supply in the form of a battery and/or an electrical connection to an external power source. The aerosol generating apparatus includes precursor, which in use is aerosolised by the aerosol generating unit. The aerosol generating apparatus includes a delivery system for delivery of aerosolised precursor to a user. Electrical circuitry may be implemented to control the interoperability of the power supply and aerosol generating unit. In variant embodiments, the power supply may be omitted, e.g., an aerosol generating unit implemented as an atomiser with flow expansion may not require a power supply.

The consumable may comprise an electrical interface for interfacing with a corresponding electrical interface of the body. One or both of the electrical interfaces may include one or more electrical contacts (which may extend through the transverse plate of the lower portion of the insert). Thus, when the body is engaged with the consumable, the electrical interface may be configured to transfer electrical power from the power source to a heating element of the consumable. The electrical interface may also be used to identify the consumable from a list of known types. The electrical interface may additionally or alternatively be used to identify when the consumable is connected to the body. In exemplary embodiments, the electrical contacts are incorporated into the push-push mechanism. For instance, engagement of the push-push receiving member with the push-push insertion member also causes engagement of the electrical contacts.

The aerosol generating apparatus may suitably generate an aerosol from a liquid precursor. Here, the delivery system includes a flow path that transmits flow in operative proximity of a heating system of the aerosol generating unit. By operative proximity it is meant that the flow is transmitted to carry vaporised and/or aerosol precursor generated from aerosol generating unit to the outlet of the delivery system. The flow path includes an inlet, and an outlet, which may be arranged as a mouthpiece. The delivery system includes a precursor transmission system to transmit the precursor, typically in liquid form from a storage, to the aerosol generating unit. The precursor transmission system may be implemented as a wick, injector or other suitable device. In such embodiments, the precursor can be contained in a reservoir or other storage portion.

In variant embodiments, the precursor transmission system may be implemented by the aerosol generating unit, for example, as a porous heating component.

In some embodiments, the consumable is implemented as a capsule/pod. The capsule is separably connectable to the body. Suitably the body comprises a power supply. In some embodiments, the capsule includes the precursor, aerosol generating unit and mouthpiece. Here, suitably a storage portion, which is implemented as a reservoir, is arranged to carry the precursor.

In variant embodiments, one or both of the aerosol generating unit and mouthpiece, are arranged as part of the body, e.g., the mouthpiece is arranged as part of the body and the precursor and aerosol generating unit are arranged as a separable consumable (e.g., a cartomizer).

In some embodiments, the aerosol generating apparatus may suitably generate an aerosol from a solid precursor. Here, a heating system of the aerosol generating unit interacts with the precursor to generate vaporised and/or aerosol precursor. The precursor is typically arranged as a solid and is arranged to receive thermal energy via conductive heat transfer from the aerosol generating unit, e.g., the heating system is arranged as a rod, which is inserted into the precursor or as a flat plate to abut a surface of the precursor. The delivery system includes a flow path that transmits flow from an inlet through (or in operative proximity to) the precursor to carry the vapour and/or aerosol to an outlet of the flow path.

In the embodiments generating aerosol from a solid precursor, a consumable is suitably implemented as a stick. Here, the stick is separably connectable to the body and the body comprises a power supply and an aerosol generating unit. Suitably, the stick includes, proximal the body, the precursor as a reconstituted tobacco formulation and, distal the body, a mouthpiece arranged as a filter. A storage portion, which is implemented as wrapping material may be arranged to carry the precursor.

The body suitably houses a source of power which may be a battery. The source of power may be a capacitor. The power source may be a rechargeable power source. The body may include a charging connection for connection to an external power supply for recharging of the power source within the body.

The body suitably comprises a body part for housing the power source and/or other electrical components. The body part may be an elongate body, i.e., with a greater length than depth/width. It may have a greater width than depth.

The body part may have a length of between 5 and 30 cm, e.g., between 10 and 20 cm such as between 10 and 13 cm. The maximum depth of the body part may be between 5 and 30 mm, e.g., between 10 and 20 mm.

The body part may have a front surface that is curved in the transverse dimension. The body part may have a rear surface that is curved in the transverse dimension. The curvatures of the front surface and rear surface may be of the opposite sense to one another. Both front and rear surfaces may be convex in the transverse dimension. They may have an equal radius of curvature. The radius of curvature of the front surface may be between 10 and 50 mm, or between 10 and 40 mm, or between 10 and 30 mm, or between 10 and 20 mm, or between 10 and 15 mm, or substantially 13.5 mm.

The front and rear surfaces may meet at opposing transverse edges of the body. This leads to a mandorla-/lemon-/eye-shaped cross-sectional shape of the body part. The transverse edges may have a radius of curvature that is significantly smaller than the radius of curvature of either the front or rear surface. This leads to the transverse edges being substantially "pointed" or "sharp". The transverse edges may have a radius of curvature in the transverse dimension of less than 10 mm, or less than 5 mm, or less than 2 mm, or less than 1 mm. The transverse edges may extend substantially the full longitudinal length of the body part. However, in some embodiments, the transverse edges may only extend along a longitudinal portion of the body part.

The body part may have a curved longitudinal axis, i.e., curved in a direction between the front and rear faces.

The front and/or rear surface of the body may include at least one visual user feedback element, for example one or more lights, e.g., one or more LEDs. In some embodiments, the body may include an illumination region configured to allow light provided by the visual user feedback element (e.g., one or more lights/LEDs) within the body to shine through.

The aerosol generating apparatus may comprise a movement detection unit (e.g., an accelerometer) for detecting a movement of the apparatus, and a haptic feedback generation unit (e.g., an electric motor and a weight mounted eccentrically on a shaft of the electric motor).

The body may include a controller. The controller may be configured to identify an operation of the aerosol generating apparatus; and control the one or more lights contained within the body, (e.g., to illuminate the illumination region) based on the operation of the apparatus identified. The controller may be configured to control the haptic feedback generation unit to generate the haptic feedback in response to the detection of movement of the apparatus by the movement detection unit.

A memory may be provided and may be operatively connected to the controller. The memory may include non-volatile memory. The memory may include instructions which, when implemented, cause the controller to perform certain tasks or steps of a method.

The aerosol generation apparatus may comprise a wireless interface, which may be configured to communicate wirelessly with an external device, for example a mobile device, e.g., via Bluetooth®. To this end, the wireless interface could include a Bluetooth® antenna. Other wireless communication interfaces, e.g., WiFi®, are also possible. The wireless interface may also be configured to communicate wirelessly with a remote server.

The aerosol generation apparatus may comprise an airflow (i.e., puff) sensor that is configured to detect a puff (i.e., inhalation from a user). The airflow sensor may be operatively connected to the controller so as to be able to provide a signal to the controller that is indicative of a puff state (i.e., puffing or not puffing). The airflow sensor may, for example, be in the form of a pressure sensor or an acoustic sensor.

The controller may control power supply to a heating element in response to airflow detection by the sensor. The control may be in the form of activation of the heating element in response to a detected airflow.

When implemented with an e-liquid consumable having the aerosol generation unit on the consumable, the body may comprise an electrical connection (e.g., one or more contact pins) for connection of the power source to the aerosol generating unit (i.e., the heating element).

The body may comprise a chassis within a body part and one or more of any electrical components of the body (e.g., one or more of the power source, charging connection, visual feedback element, movement detection unit, haptic feedback generation unit, controller, memory, wireless interface, puff sensor and/or electrical connection) may be mounted on or affixed to the chassis.

In a fifth aspect, there is provided an aerosol delivery system comprising an aerosol generating apparatus according to the first or second aspects and an external device.

The present disclosure provides a use of the aerosol generating apparatus, which may implement the features of any preceding embodiment, or another embodiment disclosed herein, for generating an aerosol for delivery to a user.

The present disclosure therefore provides a method of generating an aerosol, which may implement the features of any preceding embodiment, or another embodiment disclosed herein. In a sixth aspect there is provided a method comprising engaging the consumable with an aerosol-generating apparatus (e.g., smoking substitute apparatus) (as described above) having a power source so as to electrically connect the power source to the consumable (i.e., to the vaporiser of the consumable).

According to a seventh aspect, there is therefore provided a method of connecting and disconnecting a consumable with a body to form an aerosol generating apparatus, the method comprising: moving the consumable and body together in a first direction to cause a push-push insertion member to be received by a push-push receiving member to engage the consumable with the body; and subsequently moving the consumable and body together in the first direction to release the push-push insertion member from the receiving member to disengage the consumable from the body.

In the exemplary embodiments, the consumable is inserted into a recess of the body. Suitably, the method comprises inserting the consumable into the recess prior to the step of moving the consumable and body together in a first direction to cause a push-push insertion member to be received by a push-push receiving member. Here, the respective movement of the consumable and body to insert the consumable into the recess may also be in the first direction. Suitably, the method also comprises withdrawing the consumable from the recess after the step of subsequently moving the consumable body together in the first direction to disengage the consumable from the body. Here, the consumable may be withdrawn from the recess in a second direction, opposed to the first. In some exemplary embodiments, the method may comprises repeating the movement to cause the push-push insertion member to be received by the push-push receiving member and repeating the movement to cause the push-push insertion member to be released from the push-push receiving member a plurality of times before the subsequent movement to withdraw the consumable from the recess.

The present disclosure provides electrical circuitry, and/or a computer program configured to cause an aerosol generating system to perform said method, and a computer readable medium comprising the computer program.

According to an eighth aspect there is provided a kit of parts for forming an aerosol delivery component for a substitute smoking system, the kit of parts comprising first and second moulded component parts configured such that, when joined together, the first and second component parts define an airflow passage and aerosol precursor reservoir therebetween.

Such an arrangement may result in an overall reduction in the number of components required to assemble the aerosol delivery component and, as such, may reduce the complexity of such assembly. As a result, assembly time may be reduced and fewer production tools may be required. Additionally, the limited number of joins required to form the aerosol delivery component may assist in minimising (or eliminating) leakage of aerosol precursor from the component (e.g., stored in the reservoir).

The first component may be substantially the same as the second component (i.e., the first and second components may be substantially identical). In this respect, the first and second components may be considered as two "halves" of the component being joined.

The first and second component parts may be configured to be joined along a joining plane parallel to a longitudinal axis of the airflow passage when formed.

Each component part may comprise a passage recess formed therein. The passage recesses may be arranged such that, when the component parts are joined, the passage recesses combine (i.e., align) to define the airflow passage. The passage recesses may be configured such that, when the component parts are joined, the airflow passage extends through the (formed) component from an inlet to an outlet. In this respect, each of the first and second component parts may define an inlet portion and/or an outlet portion that, when combined, define the inlet and/or the outlet.

Each component part may comprise a reservoir recess. The reservoir recesses may be arranged such that, when the component parts are joined, the reservoir recesses combine to define the aerosol precursor reservoir. The reservoir may be substantially sealed between the first and second component parts, when joined. The reservoir may, for example, be configured to store a liquid aerosol precursor, which may comprise a base liquid and, e.g., nicotine. The base liquid may include propylene glycol and/or vegetable glycerine.

Each component part may comprise a separator wall that separates the passage recess from the reservoir recess.

Thus, the component parts may be configured such that, when joined, the passage recesses combine to define an airflow passage, the reservoir recesses combine to define an aerosol precursor reservoir, and the separator walls connect (e.g., abut or join) to define a partition wall that separates the passage from the reservoir. In other words, the component parts are configured such that, when joined, they define a component comprising an airflow passage extending therethrough and separated from an aerosol precursor reservoir by a partition wall.

Each component part may comprise an outer wall (or housing). The outer wall may comprise an external side that may define an outer (i.e., external) surface of the component when the component parts are joined. The outer wall may comprise an internal side that may partly define the recesses.

At least one of the component parts may comprise a supply inlet for receipt of aerosol precursor to fill the reservoir when the component parts are joined. The supply inlet may be formed in a portion of the outer wall defining the reservoir recess. Thus, the supply inlet may provide fluid access to the reservoir. The supply inlet may comprise a one-way valve to permit fluid flow in a direction into the reservoir (but prevent fluid flow out of the reservoir).

Alternatively, or additionally, each component part may comprise a diaphragm or septum sealing the reservoir recess (e.g., sealing over an open top of the reservoir recess). The diaphragm may be configured to be removable or pierceable upon joining of the component parts together.

The passage recess of each component part may be elongate (e.g., so as to be in the form of a groove or channel). The passage recess may extend in a direction of a longitudinal axis of the component part.

The component parts may be configured to join in a plane that extends in the longitudinal direction. Thus, for example, the first component part may form a front portion of the component when formed and the second component part may form an opposing rear portion of the component when formed (or vice-versa).

The separator wall of each component may project from the internal side of the outer wall. The separator wall may extend substantially in the longitudinal direction. In this respect, the passage recess and the reservoir recess may extend longitudinally alongside one another (i.e., separated by the separator wall). The separator may extend for substantially the length of the component part.

A distal edge (e.g., distal from the inner side of the outer wall) of the separator wall of the first component part may abut (or join with) the distal edge of the of the separator wall of the second component part when the component parts are joined.

A periphery of the outer wall of first component part may abut (or join) a periphery of the outer wall of the second component part when the component parts are joined.

The component parts may be configured such that, when joined, two aerosol precursor reservoirs are defined between the component parts. The reservoir recess of each component part may be a first reservoir recess, and each component part may further comprise a second reservoir recess. The first and second reservoir recesses of each component part may be arranged such that, when the component parts are joined, the first recesses combine to form a first aerosol precursor reservoir and the second recesses combine to form a second aerosol precursor reservoir (i.e., defined between the component parts).

The separator wall of each component part may be a first separator wall (separating the passage recess from the first reservoir recess). Each component part may further comprise a second separator wall that separates the passage recess from the second reservoir recess. The second separator wall may be as otherwise described above with respect to the first separator wall.

The first and second reservoir recesses of each component part may be disposed (e.g., laterally) either side of the passage recess of the component part. In this respect, the passage recess may extend substantially centrally in the longitudinal direction.

The component parts may be configured to retain a filter therebetween when joined. The component parts may be configured to retain the filter in the passage. In this respect, each passage recess comprises a filter retaining portion for retaining a filter when the component parts are joined. The filter retaining portion may be in the form of an enlarged portion of the passage recess (i.e., that may be filled by the filter), or may be, e.g., in the form of a rib. The filter retaining portion may be proximate the outlet. The kit of parts may comprise a filter (i.e., a porous filter).

The component parts may be configured to retain a vaporiser (e.g., comprising a wick) therebetween when joined. The component parts may be configured so as to retain (when joined) the vaporiser such that a portion of the vaporiser is disposed within the airflow passage. The component parts may be configured such that a wick of a vaporiser retained therebetween extends across the passage. At least one of the component parts may comprise a vaporiser locating portion for locating (or retaining) a vaporiser in the passage when the component parts are joined. The vaporiser locating portion may comprise a locating slot formed in a distal edge of a separator wall (e.g., for receipt of a portion of a vaporiser therein). The or each separator wall of each component part may comprise a vaporiser locating portion (e.g., slot) formed in the distal edge thereof.

Where each component part comprises first and second separator walls, each of the first and second separator walls (of at least one component) may comprise a vaporiser locating portion (e.g., locating slot). The vaporiser locating portions may be arranged to each receive a portion of a vaporiser, such as a portion of a wick of a vaporiser. The vaporiser locating portions may be disposed on opposite sides of the passage recess (e.g., directly opposite). Thus, for example, the vaporiser locating portions may be configured such that ends of the wick may be supported by the vaporiser locating portions in such a way that the wick extends transversely across the passage (i.e., when the component parts are joined). In this way, a portion of the wick may be exposed to fluid flow in the passage and end portions of the wick may protrude into respective reservoirs. Accordingly, fluid may be drawn (e.g., by capillary action) along the wick, from the reservoir to the exposed portion of the wick.

In some embodiments the separator walls of both the first and second component parts may comprise retaining slots that combine to form apertures (i.e., from the passage to the reservoirs) when the first and second components parts are joined.

The component parts may be configured to retain an electrical connector therebetween (when joined). The connector may be retained such that a portion of the connector is exposed (i.e., externally of the component). The connector may be for connection with a smoking substitute device (when the component is engaged with the device). Thus, at least one component part may comprise a connector locating portion for locating an electrical connector (i.e., for connection with a smoking substitute device when the component is engaged therewith). The connector locating portion may be in the form of a locating slot. The locating slot may be formed in an edge of an end wall (which may form part of the outer wall) of the component part.

The connector locating portion may be configured to restrict movement of the electrical connector when the components are joined (and the connector is received therebetween). For example, the connector locating portion may be configured to restrict rotation of the electrical connector. In this regard, the connector locating portion may comprise a retaining feature (e.g., a protrusion) for engagement with the connector so as to prevent such movement. Alternatively, or additionally, the connector locating portion may comprise a non-circular profile for receipt of a non-circular portion of the connector (i.e., so as to restrict rotation).

Where both component parts comprise a connector locating portion (e.g., locating slot), the connector locating portions may combine to form an aperture, which may be configured to retain the connector therein.

The or each component part may comprise two spaced connector locating portions (each being as described above) for locating two corresponding electrical connectors.

The kit of parts may comprise an electrical connector (or two connectors) for locating by the connector locating portion(s). The connector may be electrically connectable or connected to the vaporiser. The connector may be configured for electrical connection with a smoking substitute device. Thus, when the component (when formed) is engaged with a smoking substitute device, the connector may transfer power from a power source of the device to the vaporiser.

At least one of the component parts may be configured for welding (e.g., ultrasonic welding) to the other component part. The at least one component part may comprise an energy director for facilitating ultrasonic welding of the component part to the other part. The energy director may be a pointed rib (i.e., having a pointed apex). The rib may extend about a periphery of a reservoir recess of the component part (e.g., the first reservoir recess).

At least a portion of the outer wall of each component part may be translucent. For example, the outer wall may comprise a window to allow a user to visually assess the quantity of aerosol precursor in a reservoir of the component (when formed). The component may be referred to as a "clearomizer" if it includes a window, or a "cartomizer" if it does not.

The kit of parts may comprise a vaporiser comprising a wick (i.e., such as the vaporiser described above). The vaporiser may comprise a heater that may include a heating element (e.g., a heating coil surrounding the wick). The wick may comprise a porous material.

The heating element may be in the form of a filament wound about the wick (e.g., the filament may extend helically about the wick). The filament may be wound about the exposed portion of the wick. The heating element may be electrically connectable to a power source (i.e., when forming part of a formed component). Thus, in operation, the power source may supply electricity to (i.e., apply a voltage across) the heating element so as to heat the heating element. This may cause liquid stored in the wick (i.e., drawn from the reservoir) to be heated so as to form a vapour and become entrained in fluid flowing through the passage. This vapour may subsequently cool to form an aerosol in the passage.

The component parts may be configured such that, when joined to form a component, they may be physically coupled with a smoking substitute device. For example, the joined component parts may be configured for snap engagement, screwing engagement, or a bayonet engagement with a smoking substitute device. Thus, at least one of the component parts may comprise an engagement portion for engagement (e.g., snap engagement) with a smoking substitute device.

Each component party may be injection moulded. Each component part may be configured so as to be formable by a straight-pull mould (i.e., without side-actions).

According to a ninth aspect there is provided a component part configured for joining with a like-component part such that, when joined therewith, the component parts define an airflow passage and an aerosol precursor reservoir therebetween.

The component part may be configured to join with a like-component that has been rotated about a longitudinal axis thereof by 180 degrees (i.e., relative to the component part) so as to define the airflow passage and aerosol precursor reservoir therebetween.

The component part of the ninth may be as defined with respect to the first or second component part of the eighth aspect.

According to a tenth aspect there is provided an aerosol delivery component formed from the kit of parts as described with respect to the eighth aspect. The component may be a consumable for a smoking substitute system (e.g., an e-cigarette consumable).

According to an eleventh aspect there is provided an aerosol delivery component comprising a housing having spaced front and rear outer walls, outer surfaces of the front and rear outer walls defining external surfaces of the component and opposing inner surfaces defining an internal cavity therebetween, and an internal separator wall extending across the cavity from the front wall to the rear wall so as to divide the cavity into a first portion comprising a reservoir for storing a liquid aerosol precursor and a second portion comprising an airflow passage for airflow through the component.

Thus, each of the passage and reservoir may extend across the space defined between the front and rear walls (i.e., they take up the entire distance between the walls).

The internal separator wall may be a first internal separator wall and the component may comprise a second internal separator wall extending across the cavity from the front wall to the rear wall, the first and second separator walls further dividing the cavity into a third portion comprising a further reservoir for storing a liquid aerosol precursor.

The aerosol delivery component of the eleventh aspect may be as otherwise defined in the tenth aspect.

According to a twelfth aspect there is provided an aerosol delivery component comprising an aerosol precursor reservoir and an elongate airflow passage extending along a longitudinal axis, the component comprising two component parts that are joined along a joining plane that extends parallel to the longitudinal axis.

The aerosol delivery component of the twelfth aspect may be as otherwise defined in the tenth aspect.

According to a thirteenth aspect there is provided a method of forming an aerosol delivery component for a substitute smoking system, the method comprising:

- moulding a first component part;
- moulding a second component part;
- joining the first and second component parts to one another such that, when joined together, the first and second component parts define an airflow passage and an aerosol precursor reservoir therebetween.

The steps of moulding the first and second component parts may comprise injection moulding the first and second components parts.

The steps of moulding the first and second component parts may be performed using a straight-pull mould.

The step of joining the first and second component parts may comprise positioning the second component part so as to be rotated 180 degrees about a longitudinal axis relative to the first component part.

The step of joining the first and second component parts may comprise welding the first and second component parts together. The welding may be performed using an ultrasonic welding process.

The method may comprise, subsequent to joining the first and second component parts, filling (i.e., with aerosol precursor) one or more aerosol precursor reservoirs defined between the first and second component parts. The method may comprise, subsequent to filling the one or more aerosol precursor reservoirs, sealing (e.g., welding) the one or more aerosol precursor reservoirs. The sealing of the one or more reservoirs may be performed using an ultrasonic welding process.

The first and second component parts may be as described above with respect to the first aspect. Thus, for example, each of the first and second component parts may comprise a passage recess and a reservoir recess, and each of the first and second component parts may be substantially the same.

The step of joining the component parts may be performed such that the passage recesses combine to form the airflow passage and the reservoir recesses combine to form the reservoir.

In a fourteenth aspect there is provided an aerosol delivery component formed using the method of the thirteenth aspect.

In a fifteenth aspect there is provided a smoking substitute system comprising an aerosol delivery component according to the tenth, eleventh, twelfth or fourteenth aspects, and a smoking substitute device, the component being engageable with the device such that a vaporiser of the component is connected to a power source of the device.

The device may, for example, be an e-cigarette device for supplying power to the aerosol delivery component.

The smoking substitute device may include a power source. The device may comprise a controller. The device may be configured for engagement with the aerosol delivery component. The aerosol delivery component may comprise parts of the system that are disposable, and the device may comprise non-disposable or non-consumable parts (e.g., power supply, controller, sensor, etc.) that facilitate the delivery of aerosol by the component. Thus, aerosol precursor (e.g., e-liquid) may be replenished by replacing a used aerosol delivery component with an unused aerosol delivery component.

The power source may include a battery (e.g., a rechargeable battery). The electrical connection between the heater of the aerosol delivery component and the power source may be controlled or controllable by an electronic switch.

The device may comprise a memory, which may be operatively connected to the controller. The memory may include non-volatile memory. The memory may include instructions which, when implemented, cause the controller to perform certain tasks or steps of a method. The aerosol delivery component and/or device may comprise a wireless interface, which may be configured to communicate wirelessly with another device, for example a mobile device, e.g., via Bluetooth®. To this end, the wireless interface could include a Bluetooth® antenna. Other wireless communication interfaces, e.g., WiFi®, are also possible. The wireless interface may also be configured to communicate wirelessly with a remote server.

An airflow (i.e., puff) sensor may be provided that is configured to detect a puff (i.e., inhalation from a user). The airflow sensor may be operatively connected to the controller so as to be able to provide a signal to the controller that is indicative of a puff state (i.e., puffing or not puffing). The airflow sensor may, for example, be in the form of a pressure sensor or an acoustic sensor. The controller may control power supply to the heater in response to airflow detection by the sensor. The control may be in the form of activation of the heater in response to a detected airflow. The airflow sensor may form part of the device or the aerosol delivery component.

According to a sixteenth aspect, there is provided a method of manufacturing a base portion for an aerosol delivery component (e.g., a smoking substitute component), the method comprising the steps of:

- injecting a first plastic into a first mould to form a rigid plastic vaporiser support;
- transferring the vaporiser support to a second mould; and
- injecting a second plastic into the second mould to form a compressible sealing gasket portion on the vaporiser support to thereby form the base portion.

In this way, the base portion can be manufactured in a twin-shot injection moulding process without requiring manual assembly of the gasket/o-ring to form the base portion. This reduces assembly time and costs and the over-moulded gasket is less susceptible to dislodgment during subsequent manufacturing steps. In turn, this reduces the chances of leakage from the component.

Optional features of the sixteenth aspect will now be set out. These are applicable singly or in any combination with any of the following aspects.

The first plastic may be injected into the first mould so as to form a rigid plastic vaporiser support having an end portion with an end face. The end portion may comprise a longitudinally-extending perimeter wall. The longitudinally-extending perimeter wall may comprise a perimeter groove extending at least partially and preferably entirely around the perimeter wall of the end portion.

The first plastic may be injected into the first mould so as to form a longitudinally-extending moulding gate in the perimeter wall of the end portion extending between the end face of the end portion and the perimeter groove. The moulding gate may comprise a longitudinally-extending channel recessed into the perimeter wall.

The method may comprise injecting the first plastic into the first mould to form a rigid plastic vaporiser support having an end portion comprising a longitudinally-extending perimeter wall (204). The support may also have at least one gasket aperture for receiving an electrical contact of the aerosol delivery component.

The method may comprise injecting the first plastic into the first mould such that, when the vaporiser support is arranged in the second mould, the gasket aperture is fluidly connected to the longitudinally-extending perimeter wall.

The second plastic may be injected (e.g., into the moulding gate) to form a perimeter gasket extending at least partially and preferably entirely around the perimeter wall (e.g., in the perimeter groove) of the end portion of the vaporiser support.

The method may comprise injecting the second plastic to form a perimeter gasket located on the longitudinally-extending perimeter wall, and at least one contact gasket arranged in the at least one contact gasket aperture such that the at least one contact gasket and the perimeter gasket are physically connected together.

Accordingly, in some embodiments, there is a method of manufacturing a base portion for an aerosol delivery component (e.g., a smoking substitute component), the method comprising the steps of:
- injecting a first plastic into a first mould to form a rigid plastic vaporiser support having an end portion comprising a longitudinally-extending perimeter wall, and at least one gasket aperture for receiving an electrical contact of the aerosol delivery component;
- transferring the vaporiser support to a second mould; and
- injecting a second plastic into the second mould to form a compressible sealing gasket portion on the vaporiser support to thereby form the base portion;
- wherein the method comprises:
  - injecting the first plastic into the first mould such that, when the vaporiser support is arranged in the second mould, the gasket aperture is fluidly connected to the longitudinally-extending perimeter wall; and
  - injecting the second plastic to form a perimeter gasket located on the longitudinally-extending perimeter wall, and at least one contact gasket arranged in the at least one contact gasket aperture such that the at least one contact gasket and the perimeter gasket are physically connected together.

After removal of the base portion from the second mould, the method may further comprise sealing the perimeter gasket against the inner surface of a tank housing.

The first plastic may be injected into the first mould so that the end portion comprises at least one aperture (e.g., a pair of apertures) extending from the end face to an opposing inner face of the end portion. The inner face of the end portion may comprise a support portion for supporting a wick. The support portion may be upstanding from the inner face of the end portion and may comprise an annular wall having opposing channels for receiving the wick.

The method may further comprise (after removal of the base portion from the second mould) insertion of a vaporiser comprising a wick having a coiled heating element into the support portion of the vaporiser support with opposing ends of the wick supported in the opposing channels.

The first plastic may be injected into the first mould so that the perimeter wall of the end portion comprises at least one longitudinally-extending gasket channel (distinct and remote from the moulding gate) extending from the perimeter groove to the end face proximal the at least one aperture.

The second plastic may be injected into the second mould (e.g., into the moulding gate) to form a respective contact gasket in the at least one aperture. The injected first plastic will first fill the perimeter groove to form the perimeter gasket and then will flow from the perimeter groove through the at least one gasket channel so as to form the at least one contact gasket lining the respective aperture. The/each contact gasket will have a respective gasket aperture.

The method may further comprise (after removal of the base portion from the second mould), inserting a respective electrical contact through the gasket aperture for connection with the heating element. In this way, sealing gaskets to seal both the tank and the electrical contacts can be formed in a single injection moulding step.

The first plastic may be thermoset plastic material, e.g., polypropylene.

The second plastic may be a thermoplastic material, e.g., polyurethane.

The first plastic and second plastic base be different colours. The colour of the first and/or second plastic may be selected to provide a visual indication of a characteristic (e.g., nicotine strength and/or flavour) of the component.

The vaporiser support may be moved from the first mould to the second mould using a robotic arm. The base portion may be removed from the second mould using the or a second robotic arm.

The first and second moulds may be provided in a single press.

In some embodiments, as the second plastic is injected into the second mould, the first plastic may be injected into the first mould to form a second rigid plastic vaporiser support. The second vaporiser support may then be moved (e.g., using the robotic arm) to the second mould after the base portion has been removed from the second mould for subsequent injection of the second plastic into the second mould to form a second base portion.

In a seventeenth aspect, there is provided an integrally moulded base portion for an aerosol delivery component (e.g., a smoking substitute component), the base portion comprising:
- a vaporiser support formed of a rigid plastic; and
- a sealing gasket portion formed of compressible plastic over-moulded on the vaporiser support for sealing against an internal surface of the aerosol delivery component.

The sealing gasket portion may comprise an external sealing gasket, i.e., provided on an external surface of the vaporiser support for sealing between the vaporiser support and the internal surface of the aerosol delivery component.

The vaporiser support may have an end portion with an end face. The end portion may comprise a longitudinally-extending perimeter wall. The longitudinally-extending perimeter wall may comprise a perimeter groove extending at least partially and preferably entirely around the perimeter wall of the end portion.

The vaporiser support may comprise an end portion with a longitudinally-extending perimeter wall, and at least one gasket aperture for receiving an electrical contact of the aerosol delivery component.

The perimeter wall may comprise a longitudinally-extending moulding gate extending between the end face of the end portion and the perimeter groove. The moulding gate may comprise a longitudinally-extending groove recessed into the surface of the perimeter wall. The moulding gate may be filled with the compressible plastic which may be flush with the surface of the perimeter wall of the end portion.

The sealing gasket portion may comprise a perimeter gasket located on the perimeter wall, e.g., in the perimeter groove of the end portion of the vaporiser support. The perimeter gasket may extend at least partially and preferably entirely around the perimeter wall of the end portion. The perimeter gasket extends radially/laterally from the perimeter wall, i.e., is proud of the surface of the perimeter wall.

The gasket portion may further comprise at least one contact gasket (e.g., a pair of contact gaskets) formed of the compressible plastic. For example, the end portion of the vaporiser support may comprise at least one aperture (e.g., a pair of apertures) extending from the end face to an opposing inner face of the end portion. The at least one contact gasket may line the at least one aperture. The/each contact gasket will have a respective gasket aperture.

The sealing gasket portion may comprise: a perimeter gasket located on the longitudinally-extending perimeter wall and at least one contact gasket arranged in the at least one contact gasket aperture. The perimeter gasket and the at least one contact gasket may be physically connected together.

The vaporiser support may comprise at least one longitudinally-extending gasket channel formed in the perimeter wall and extending from the perimeter groove to the end face of the end portion of the vaporiser support proximal the respective aperture.

The inner face of the end portion may comprise a support portion for supporting a wick. The support portion may be upstanding from the inner face of the end portion and may comprise an annular wall having opposing channels for receiving the wick.

The rigid plastic may be thermoset plastic material, e.g., polypropylene.

The compressible plastic may be a thermoplastic material, e.g., polyurethane.

The rigid plastic and compressible plastic may be different colours. The colour of the rigid and/or compressible plastic may be selected to provide a visual indication of a characteristic (e.g., nicotine strength and/or flavour) of the component.

In some embodiments, there is provided an integrally moulded base portion for an aerosol delivery component, the base portion comprising:
- a vaporiser support formed of a rigid plastic, wherein the vaporiser support comprises an end portion with a longitudinally-extending perimeter wall, and at least one gasket aperture for receiving an electrical contact of the aerosol delivery component; and
- a sealing gasket portion formed of compressible plastic over-moulded on the vaporiser support for sealing against an internal surface of the aerosol delivery component;
- wherein the sealing gasket portion comprises:
  - a perimeter gasket located on the longitudinally-extending perimeter wall; and
  - at least one contact gasket arranged in the at least one contact gasket aperture;
  - wherein the perimeter gasket and the at least one contact gasket are physically connected together.

In an eighteenth aspect, there is provided an aerosol delivery component (e.g., a smoking substitute component) comprising a base portion according to the seventeenth aspect.

The perimeter gasket may be sealed against the inner surface of a tank housing.

The component may further comprise a vaporiser having a wick with a coiled heating element mounted on the support portion of the vaporiser support with opposing ends of the wick supported in the opposing channels.

The component may further comprise at least one electrical contact extending through a respective the gasket aperture for connection with the heating element. The at least one contact gasket will seal against the respective electrical contact.

The smoking substitute component may comprise an airflow path therethrough, the airflow path extending from an air inlet to an outlet. The air inlet may be provided in the base portion, e.g., in the vaporiser support. The outlet may be at a mouthpiece portion of the component. In this respect, a user may draw fluid (e.g., air) into and along the airflow path by inhaling at the outlet (i.e., using the mouthpiece).

The airflow path passes the vaporiser between the air inlet and the outlet.

The airflow path may comprise a first portion extending from the air inlet towards the vaporiser. The second portion of the airflow path passes through a vaporising chamber to a conduit that extends to the outlet. The conduit may extend along the axial centre of the component.

References to "downstream" in relation to the airflow path are intended to refer to the direction towards the outlet/mouthpiece portion. Thus, the second portion of the airflow path is downstream of the first portion of the airflow path. Conversely, references to "upstream" are intended to refer to the direction towards the air inlet. Thus, the first portion of the airflow path (and the air inlet) is upstream of the second portion of the airflow path (and the air outlet/mouthpiece portion).

References to "upper", "lower", "above" or "below" are intended to refer to the component when in an upright/vertical orientation, i.e., with elongate (longitudinal/length) axis of the component vertically aligned and with the mouthpiece vertically uppermost.

The component may comprise a tank for housing the aerosol precursor (e.g., a liquid aerosol precursor). The aerosol precursor may comprise an e-liquid, for example, comprising a base liquid and, e.g., nicotine. The base liquid may include propylene glycol and/or vegetable glycerine.

At least a portion of the tank housing defining the tank may be translucent or transparent.

The conduit may extend through the tank with the conduit walls defining an inner region of the tank. In this respect, the tank may surround the conduit, e.g., the tank housing may be annular.

As discussed above, the air flow path passes the vaporiser between the air inlet and the outlet.

The wick may be an elongate wick which may have a cylindrical shape. The wick may be oriented so as to extend in the direction of the width dimension of the component (perpendicular to the longitudinal axis of the component). Thus, the wick may extend in a direction perpendicular to the direction of airflow in the airflow path.

The wick/heating element may be disposed in the vaporising chamber. The vaporising chamber may form part of the airflow path.

The wick may comprise a porous material. A portion of the wick may be exposed to airflow in the airflow path. The wick may also comprise one or more portions in contact with liquid aerosol precursor stored in the tank. For example, the opposing ends of the wick supported in the opposing channels of the support portion of the vaporiser support may protrude into the tank and a central portion (between the ends) may extend across the airflow path so as to be exposed to airflow. Thus, fluid may be drawn (e.g., by capillary action) along the wick, from the tank to the exposed portion of the wick.

The heating element may be in the form of a filament wound about the wick (e.g., the filament may extend helically about the wick). The filament may be wound about the exposed portion of the wick. The heating element is electrically connected (or connectable) to the power source. Thus, in operation, the power source may supply electricity to (i.e., apply a voltage across) the heating element so as to heat the heating element. This may cause liquid stored in the wick (i.e., drawn from the tank) to be heated so as to form a vapour and become entrained in airflow along the airflow path. This vapour may subsequently cool to form an aerosol, e.g., in the conduit.

In a nineteenth aspect there is provided an aerosol-delivery system (e.g., a smoking substitute system) comprising a component according to the sixteenth aspect and an aerosol-delivery (e.g., smoking substitute) device.

The component may be an aerosol-delivery (e.g., a smoking substitute) consumable, i.e., in some embodiments the component may be a consumable component for engagement with the aerosol-delivery (e.g., a smoking substitute) device to form the aerosol-delivery (e.g., s smoking substitute) system.

The device may be configured to receive the consumable component. For example, the device and the consumable component may be configured to be physically coupled together. For example, the consumable component may be at least partially received in a recess of the device, such that there is snap engagement between the device and the consumable component. Alternatively, the device and the consumable component may be physically coupled together by screwing one onto the other, or through a bayonet fitting.

Thus, the consumable component may comprise one or more engagement portions for engaging with the device.

The consumable component may comprise an electrical interface for interfacing with a corresponding electrical interface of the device. The component electrical interface will comprise the at least one electrical contact.

Thus, when the device is engaged with the consumable component, the electrical interface may be configured to transfer electrical power from the power source to the heating element of the consumable component. The electrical interface may also be used to identify the consumable component from a list of known types. The electrical interface may additionally or alternatively be used to identify when the consumable component is connected to the device.

The device may alternatively or additionally be able to detect information about the consumable component via an RFID reader, a barcode or QR code reader. This interface may be able to identify a characteristic (e.g., a type) of the consumable. In this respect, the consumable component may include any one or more of an RFID chip, a barcode or QR code, or memory within which is an identifier and which can be interrogated via the interface.

In other embodiments, the component may be integrally formed with the aerosol-delivery (e.g., a smoking substitute) device to form the aerosol-delivery (e.g., s smoking substitute) system.

In such embodiments, the aerosol former (e.g., e-liquid) may be replenished by re-filling a tank that is integral with the device (rather than replacing the consumable). Access to the tank (for re-filling of the e-liquid) may be provided via, e.g., an opening to the tank that is sealable with a closure (e.g., a cap).

Further features of the device are described below. These are applicable to both the device for receiving a consumable component and to the device integral with the component.

The device may comprise a power source. The power source may be a battery. The power source may be a capacitor. The power source may be a rechargeable power source. The device may comprise a charging connection for connection to an external power supply for recharging of the power source within the device.

The device may comprise electrical circuitry configured to control the supply of power from the power source to the vaporiser.

The device may comprise a controller. A memory may be provided and may be operatively connected to the controller. The memory may include non-volatile memory. The memory may include instructions which, when implemented, cause the controller to perform certain tasks or steps of a method. The device may comprise a wireless interface, which may be configured to communicate wirelessly with another device, for example a mobile device, e.g., via Bluetooth®. To this end, the wireless interface could include a Bluetooth® antenna. Other wireless communication interfaces, e.g., WiFi®, are also possible. The wireless interface may also be configured to communicate wirelessly with a remote server.

An airflow (i.e., puff) sensor may be provided that is configured to detect a puff (i.e., inhalation from a user). The airflow sensor may be operatively connected to the controller so as to be able to provide a signal to the controller that is indicative of a puff state (i.e., puffing or not puffing). The airflow sensor may, for example, be in the form of a pressure sensor or an acoustic sensor. The controller may control power supply to a heating element in response to airflow detection by the sensor. The control may be in the form of activation of the heating element in response to a detected airflow. The airflow sensor may form part of the device.

The device may comprise a device body for housing the power source and/or other electrical components. The device body may be an elongate body, i.e., with a greater length than depth/width. It may have a greater width than depth.

In a twentieth aspect there is provided a method of using the aerosol-delivery (e.g., smoking substitute) consumable component according to the third aspect, the method comprising engaging the consumable component with an aerosol-delivery (e.g., smoking substitute) device (as described above) having a power source so as to electrically connect the power source to the consumable component (i.e., to the vaporiser of the consumable component).

The preceding summary is provided for purposes of summarizing some embodiments to provide a basic understanding of aspects of the subject matter described herein. Accordingly, the above-described features are merely examples and should not be construed to narrow the scope or spirit of the subject matter described herein in anyway. Moreover, the above and/or proceeding embodiments may be combined in any suitable combination to provide further embodiments. Other features, aspects, and advantages of the subject matter described herein will become apparent from the following Detailed Description, Figures, and Claims.

BRIEF DESCRIPTION OF THE DRAWINGS

Aspects, features and advantages of embodiments of the present disclosure will become apparent from the following description of embodiments in reference to the appended drawings in which like numerals denote like elements, and in which:

FIG. 1A is a front schematic view of a smoking substitute apparatus;

FIG. 1B is a front schematic view of a body of the apparatus;

FIG. 1C is a front schematic view of a consumable of the apparatus;

FIG. 6 is a front schematic view of an aerosol generating apparatus showing a consumable ready for connection with a body;

FIG. 7 is a schematic cross-section view showing the aerosol generating apparatus of FIG. 6 with the consumable and body connected;

FIG. 8 is a front schematic view of an aerosol generating apparatus showing a consumable connected with a body;

FIG. 9 is a schematic cross-section view showing the aerosol generating apparatus of FIG. 8 with the consumable and body connected;

FIG. 11 is a front view of a component part forming part of the aerosol delivery component;

FIG. 12 is a front view of a variation of the component part of FIG. 11;

FIGS. 13A-D show a method according to a first embodiment of the sixteenth aspect;

DETAILED DESCRIPTION OF THE EMBODIMENTS

Figure 2A:
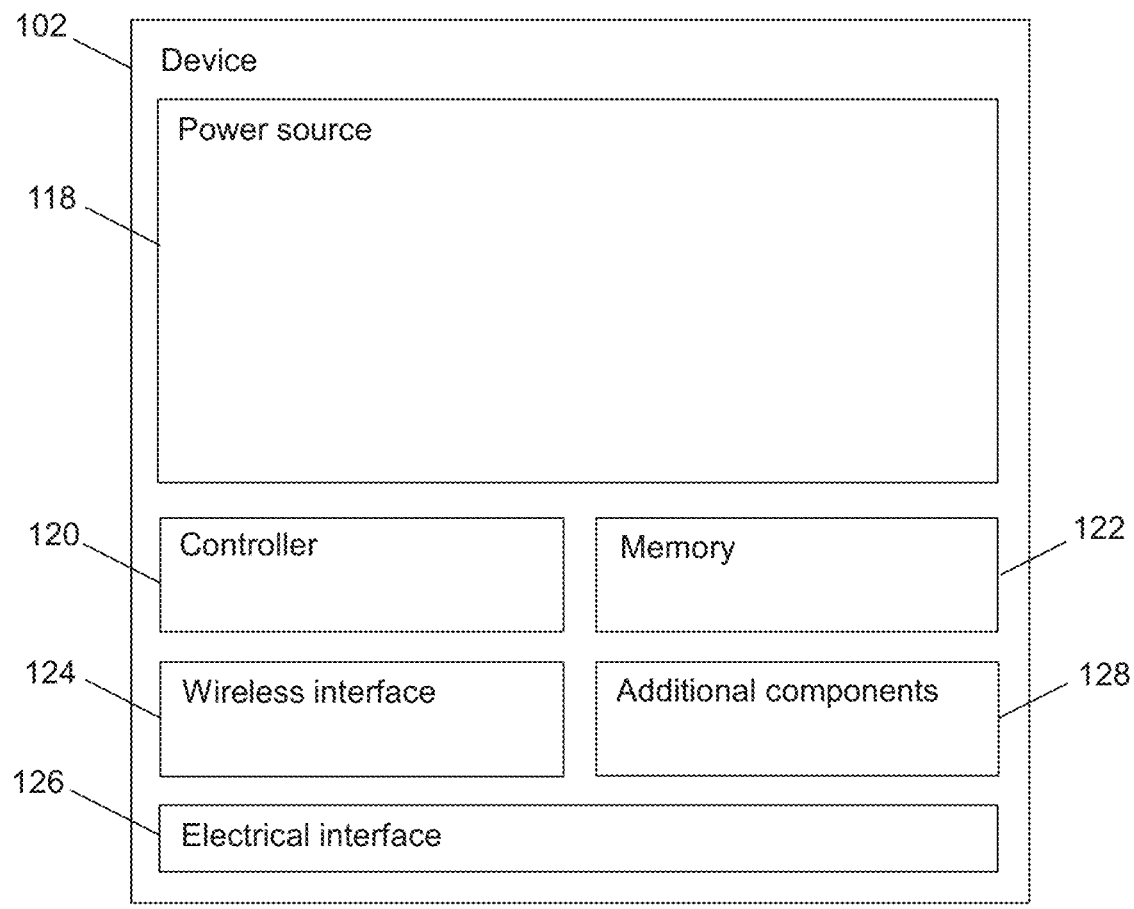
FIG. 2A is a schematic of the electrical components of the body.

Before describing several embodiments of aerosol generating system and apparatus, it is to be understood that the system and apparatus is not limited to the details of construction or process steps set forth in the following description. It will be apparent to those skilled in the art having the benefit of the present disclosure that the systems, apparatuses and/or methods described herein could be embodied differently and/or be practiced or carried out in various ways.

Unless otherwise defined herein, scientific and technical terms used in connection with the presently disclosed inventive concept(s) shall have the meanings that are commonly understood by those of ordinary skill in the art, and known techniques and procedures may be performed according to conventional methods well known in the art and as described in various general and more specific references that may be cited and discussed in the present specification.

All of the systems, apparatus, and/or methods disclosed herein can be made and executed without undue experimentation in light of the present disclosure. While they have been described in terms of particular embodiments, it will be apparent to those of skill in the art that variations may be applied to the systems, apparatus, and/or methods and in the steps or in the sequence of steps of the methods described herein without departing from the concept, spirit, and scope of the inventive concept(s). All such similar substitutions and modifications apparent to those skilled in the art are deemed to be within the spirit, scope, and concept of the inventive concept(s) as defined by the appended claims.

The use of the term "a" or "an" in the present disclosure (including the claims) may mean "one," as well as "one or more," "at least one," and "one or more than one." As such, the terms "a," "an," and "the," as well as all singular terms, include plural referents unless the context clearly indicates otherwise. Likewise, plural terms shall include the singular unless otherwise required by context.

The use of the term "or" in the present disclosure (including the claims) is used to mean an inclusive "and/or" unless explicitly indicated to refer to alternatives only or unless the alternatives are mutually exclusive. For example, a condition "A or B" is satisfied by any of the following: A is true (or present) and B is false (or not present), A is false (or not present) and B is true (or present), and both A and B are true (or present).

As used in the present disclosure (including the claims), the words "comprising", "having", "including", or "containing" (and any forms thereof, such as "comprise" and "comprises", "have" and "has", "includes" and "include", or "contains" and "contain", respectively) are inclusive or open-ended and do not exclude additional, unrecited elements or method steps.

Unless otherwise explicitly stated as incompatible, or the physics or otherwise of the embodiments, example, or claims prevent such a combination, the features of the foregoing embodiments and examples, and of the following claims may be integrated together in any suitable arrangement, especially ones where there is a beneficial effect in doing so. This is not limited to only any specified benefit, and instead may arise from an "ex post facto" benefit. This is to say that the combination of features is not limited by the described forms, particularly the form (e.g., numbering) of the example(s), embodiment(s), or dependency of the claim(s). Moreover, this also applies to the phrase "in one embodiment," "according to an embodiment," and the like, which are merely a stylistic form of wording and are not to be construed as limiting the following features to a separate embodiment to all other instances of the same or similar wording. This is to say, a reference to 'an,' 'one,' or 'some' embodiment(s) may be a reference to any one or more, and/or all embodiments, or combination(s) thereof, disclosed. Also, similarly, the reference to "the" embodiment may not be limited to the immediately preceding embodiment. Further, all references to one or more embodiments or examples are to be construed as non-limiting to the claims.

The present disclosure may be better understood in view of the following explanations, wherein the terms used that are separated by "or" may be used interchangeably:

As used herein, the term "aerosol generating apparatus" or "aerosol delivery apparatus" or "apparatus" or "electronic (e)-cigarette" may include apparatus to deliver an aerosol to a user for inhalation. The apparatus may also be referred to as a "smoking substitute apparatus", which may refer to apparatus intended to be used instead of a conventional combustible smoking article. As used herein a "smoking article" may refer to a cigarette, cigar, pipe or other article, that produces smoke (an aerosol comprising solid particulates and gas) via heating above the thermal decomposition temperature (typically by combustion and/or pyrolysis). The apparatus may include an aerosol generating unit that may generate a vapour that may subsequently condense into the aerosol before delivery to an outlet, which may be arranged as a mouthpiece. The apparatus may be configured to deliver an aerosol for inhalation, which may comprise an aerosol with particle sizes of 0.2-7 microns, or less than 10 microns, or less than 7 microns. This particle size may be achieved by control of one or more of: heater temperature; cooling rate as the vapour condenses to an aerosol; flow properties including turbulence and velocity. The apparatus may be portable. As used herein, the term "Portable" may refer to the apparatus being for use when held by a user. The apparatus may be adapted to generate a variable amount of aerosol, e.g., by activating an aerosol generating unit of the apparatus for a variable amount of time, (as opposed to a metered dose of aerosol), which may be controlled by an input device. The input device may be configured to be user activated, and may for example include or take the form of a vaping button and/or inhalation sensor. Each occurrence of the aerosol generating apparatus being caused to generate aerosol for a period of time (which may be variable, see above) may be referred to as an "activation" of the aerosol generating apparatus. The aerosol generating apparatus may be arranged to vary an amount of aerosol delivered to a user based on the strength/duration of a draw of a user through a flow path of the apparatus (to replicate an effect of smoking a conventional combustible smoking article).

As used herein, the term "aerosol generating system" or "aerosol delivery system" or "system" may include the aerosol generating apparatus and optionally other circuitry/componentry associated with the function of the apparatus, e.g., an external device and/or an external component (here "external" is intended to mean external to the aerosol generating apparatus). As used herein, the terms "external device" and "external component" may include one or more of a: a mobile device (which may be connected to the aerosol generating apparatus, e.g., via a wireless or wired connection); a networked-based computer (e.g., a remote server); a cloud-based computer; any other server system.

As used herein, the term "aerosol" may include a suspension of precursor, including as one or more of: solid particles; liquid droplets; gas. Said suspension may be in a gas including air. Aerosol herein may generally refer to/include a vapour. Aerosol may include one or more components of the precursor.

As used herein, the term "aerosol-forming precursor" or "precursor" or "aerosol-forming substance" or "aerosol-forming substrate" may refer to one or more of a: liquid; solid; gel; loose leaf material; other substance. The precursor may be configured to be processed by an aerosol generating unit of the apparatus to form an aerosol. The precursor may include one or more of: an active component; a carrier; a flavouring. The active component may include one or more of nicotine; caffeine; a cannabidiol oil; a non-pharmaceutical formulation, e.g., a formulation which is not for treatment of a disease or physiological malfunction of the human body. The active component may be carried by the carrier, which may be a liquid, including propylene glycol and/or glycerine. The term "flavouring" may refer to a component that provides a taste and/or a smell to the user. The flavouring may include one or more of: Ethylvanillin (vanilla); menthol, Isoamyl acetate (banana oil); or other. The precursor may include a substrate, e.g., reconstituted tobacco to carry one or more of the active component; a carrier; a flavouring.

As used herein, the term "electrical circuitry" or "electric circuitry" or "circuitry" or "control circuitry" may refer to one or more of the suitable hardware or software components, examples of which may include: an Application Specific Integrated Circuit (ASIC); electronic/electrical componentry (which may include combinations of transistors, resistors, capacitors, inductors etc); one or more processors; a non-transitory memory (e.g., implemented by one or more memory devices), that may store one or more software or firmware programs; a combinational logic circuit; interconnection of the aforesaid. The electrical circuitry may be located entirely at the apparatus, or distributed between the apparatus and/or on one or more external devices in communication with the apparatus, e.g., as part of the system [Note that if we refer to operations of the electrical circuitry, they are not limited to being executed onboard the apparatus].

As used herein, the term "processor" or "processing resource" may refer to one or more units for processing, examples of which include an ASIC, microcontroller, FPGA, microprocessor, digital signal processor (DSP) capability, state machine or other suitable component. A processor may be configured to execute a computer program, e.g., which may take the form of machine readable instructions, which may be stored on a non-transitory memory and/or programmable logic. The processor may have various arrangements corresponding to those discussed for the circuitry, e.g., on-board and/or off board the apparatus as part of the system. As used herein, any machine executable instructions, or computer readable media, may be configured to cause a disclosed method to be carried out, e.g., by an aerosol generating apparatus or system as disclosed herein, and may therefore be used synonymously with the term method, or each other.

As used herein, the term "external device" or "external electronic device" or "electronic user device" or "peripheral device" may include electronic components external to the apparatus, e.g., those arranged at the same location as the apparatus or those remote from the apparatus. The external electronic device may comprise electronic computer devices including: a smartphone; a PDA; a video game controller; a tablet; a laptop; or other like device.

As used herein, the term "computer readable medium/media" or "data storage" may include any medium capable of storing a computer program, and may take the form of any conventional non-transitory memory, for example one or more of: random access memory (RAM); a CD; a hard drive; a solid state drive; a memory card; a DVD. The memory may have various arrangements corresponding to those discussed for the circuitry/processor.

As used herein, the term "information carrying medium" may include one or more arrangements for storage of information on any suitable medium. Examples include: computer readable medium/media or data storage as defined herein; a Radio Frequency Identification (RFID) transponder; codes encoding information, such as optical (e.g., a bar code or QR code) or mechanically read codes (e.g., a configuration of the absence or presents of cut-outs to encode a bit, through which pins or a reader may be inserted).

As used herein, the term "communication resources" or "communication interface" may refer to hardware and/or firmware for electronic information transfer. The communication resources/interface may be configured for wired communication ("wired communication resources/interface") or wireless communication ("wireless communication resources/interface"). Wireless communication resources may include hardware to transmit and receive signals by radio and may include various protocol implementations, e.g., the 802.11 standard described in the Institute of Electronics Engineers (IEEE) and Bluetooth™ from the Bluetooth Special Interest Group of Kirkland Wash. Wired communication resources may include; Universal Serial Bus (USB); High-Definition Multimedia Interface (HDMI) or other protocol implementations. The apparatus may include communication resources for wired or wireless communication with an external device.

As used herein, the term "network" or "computer network" may refer to a system for electronic information transfer between a plurality of apparatuses/devices. The network may, for example, include one or more networks of any type, which may include: a Public Land Mobile Network (PLMN); a telephone network (e.g., a Public Switched Telephone Network (PSTN) and/or a wireless network); a local area network (LAN); a metropolitan area network (MAN); a wide area network (WAN); an Internet Protocol Multimedia Subsystem (IMS) network; a private network; the Internet; an intranet.

It will be appreciated that any of the disclosed methods (or corresponding apparatuses, programs, data carriers, etc.) may be carried out by either a host or client, depending on the specific implementation (i.e., the disclosed methods/apparatuses are a form of communication(s), and as such, may be carried out from either 'point of view', i.e., in corresponding to each other fashion). Furthermore, it will be understood that the terms "receiving" and "transmitting" encompass "inputting" and "outputting" and are not limited to an RF context of transmitting and receiving electromagnetic (e.g., radio) waves. Therefore, for example, a chip or other device or component for realizing embodiments could generate data for output to another chip, device or component, or have as an input data from another chip, device, or component, and such an output or input could be referred to as "transmit" and "receive" including gerund forms, that is, "transmitting" and "receiving," as well as such "transmitting" and "receiving" within an RF context.

As used herein, the term "storage portion" may refer to a portion of the apparatus adapted to store the precursor, it may be implemented as fluid holding reservoir or carrier for solid material depending on the implementation of the precursor as defined above.

As used herein, the term "flow path" may refer to a path or enclosed passageway through the apparatus, through which the user may inhale for delivery of the aerosol. The flow path may be arranged to receive aerosol from an aerosol generating unit. When referring to the flow path, upstream and downstream may be defined in respect of a direction of flow in the flow path, e.g., the outlet is downstream of the inlet.

As used herein, the term "delivery system" may refer to a system operative to deliver an aerosol to a user. The delivery system may include a mouthpiece/a mouthpiece assembly and the flow path.

As used herein, the term "flow" may refer to a flow in the flow path. The flow may include aerosol generated from the precursor. The flow may include air, which may be induced into the flow path via a puff.

As used herein, the term "inhale" or "puff" or "draw" may refer to a user expansion of the lungs and/or oral cavity to create a pressure reduction that induces flow through the flow path.

As used herein, the term "heating system" may refer to an arrangement of one or more heating elements, which are operable to aerosolise the precursor once heated. The heating elements may be electrically resistive to produce heat from electrical current therethrough. The heating elements may be arranged as susceptors to produce heat when penetrated by an alternating magnetic field. The heating system may heat the precursor to below 300 or 350 degrees C., including without combustion.

As used herein, the term "consumable" may refer to a unit that includes or consists of the precursor. The consumable may include the aerosol generating unit, e.g., it is arranged as a cartomizer. The consumable may include the mouthpiece. The consumable may include the information carrying medium. With liquid or gel implementations of the precursor, e.g., an E-liquid, the consumable may be referred to as a "capsule" or a "pod" or "E-liquid consumable". The capsule may include the storage portion, e.g., a reservoir, for storage of the precursor. With solid material implementations of the precursor, e.g., tobacco or reconstituted tobacco formulation, the consumable may be referred to as a "stick" or "package" or "heat not burn consumable". In a heat not burn consumable the mouthpiece may be implemented as a filter and the consumable may be arranged to carry the precursor. The consumable may be implemented as a dosage or pre-portioned amount of material, including a loose-leaf product.

As used herein the term "heat not burn" or "heated precursor" may refer to the heating of a precursor, typically tobacco, without combustion, or without substantial combustion (i.e., localised combustion may be experienced of limited portions of the precursor, including of less than 5% of the total volume).

Referring to the Figures and according to exemplary embodiments, there is provided an aerosol generating apparatus 100 comprising a consumable component 104 that is engaged with a body/device 102 by a push-push connection 300 (see FIGS. 6 and 7). The push-push connection 300 is a connection between first and second parts wherein the first and second parts can be engaged by relative movement in a first linear direction (e.g., by pushing the two parts together, herein an initial push action). Once engaged, the push-push connection prevents the parts from being disconnected by relative movement in a second linear direction where the second direction is opposed to the first direction (e.g., the two parts are prevented from being pulled apart). Rather, to disconnect the two parts, a second relative movement in the first direction is required to disengage the push-push connection 300 (e.g., by pushing the parts together, herein a secondary push action). After the secondary push action, the push-push connection 300 is disengaged, which allows the two parts to be separated by movement in the second direction. Advantageously, incorporating a push-push connection into an aerosol generating apparatus 100, provides an enhanced user experience. For instance, the user experience is enhanced because the consumable is locked to the body after the initial push, providing increased protection to accidental removal of the consumable. Furthermore, the secondary push followed by a change to a pull movement to separate the consumable and body means the movement action is less likely to be replicated in normal use (i.e., when carried in a user's bag or pocket or the like). Yet further, the push-push connection provides an increased user experience as the repeated push action to engage and disengage the consumable (without the pull action to separate the two) provides a fiddle factor to the apparatus.

It is envisaged that the push-push connection 300 could be applied to any type of aerosol generating apparatus. For instance, both an aerosol generating apparatus that generates an aerosol from a liquid percussor, and an aerosol generating apparatus that generates an aerosol from a solid percussor.

The aerosol generating apparatus including a consumable component 104, body/device 102 and push-push connection 300 to releasably engage the consumable to the body will first be described in relation to FIGS. 1 to 7 that shows an example of an aerosol generating apparatus for generating an aerosol from a liquid percussor. Here, FIG. 1A shows a first embodiment of a smoking substitute system 100 (e.g., an aerosol generating apparatus). In this example, the smoking substitute system 100 includes a body/device 102 and a consumable component 104. The consumable component 104 may alternatively be referred to as a "pod", "cartridge" or "cartomizer". It should be appreciated that in other examples (i.e., open systems), the body may be integral with the consumable. In such apparatuses, a tank of the aerosol delivery apparatus may be accessible for refilling the apparatus.

In this example, the smoking substitute apparatus 100 is a closed system vaping apparatus, wherein the consumable component 104 includes a sealed tank 106 and is intended for single-use only. The consumable component 104 is removably engageable with the body/device 102 (i.e., for removal and replacement). FIG. 1A shows the smoking substitute apparatus 100 with the body/device 102 physically coupled to the consumable component 104, FIG. 1B shows the body/device 102 of the smoking substitute apparatus 100 without the consumable component 104, and FIG. 1C shows the consumable component 104 of the smoking substitute apparatus 100 without the body/device 102.

The body/device 102 and the consumable component 104 are configured to be physically coupled together by pushing the consumable component 104 into a cavity (i.e., a recess) at an upper end 108 of the body/device 102, such that there is an interference fit between the body/device 102 and the consumable component 104. In other examples, the device and the consumable may be coupled by screwing one onto the other, or through a bayonet fitting.

The consumable component 104 includes an outlet (not shown) in a mouthpiece portion at an upper end 109 of the consumable component 104, and one or more air inlets (not shown) in fluid communication with the mouthpiece portion such that air can be drawn into and through the consumable component 104 when a user inhales through the mouthpiece portion. The tank 106 containing e-liquid is located at the lower end 111 of the consumable component 104.

The tank 106 includes a window 112, which allows the amount of aerosol precursor (e.g., e-liquid) in the tank 106 to be visually assessed. The body/device 102 includes a slot 114 so that the window 112 of the consumable component 104 can be seen whilst the rest of the tank 106 is obscured from view when the consumable component 104 is inserted into the cavity at the upper end 108 of the body/device 102.

The lower end 110 of the body/device 102 also includes a light 116 (e.g., an LED) located behind a small translucent cover. The light 116 may be configured to illuminate when the smoking substitute system 100 is activated. Whilst not shown, the consumable component 104 may identify itself to the body/device 102, via an electrical interface, RFID chip, or barcode.

The lower end 110 of the body/device 102 also includes a charging connection 115, which is usable to charge a battery within the body/device 102. The charging connection 115 can also be used to transfer data to and from the body/device, for example to update firmware thereon.

Figure 2B:
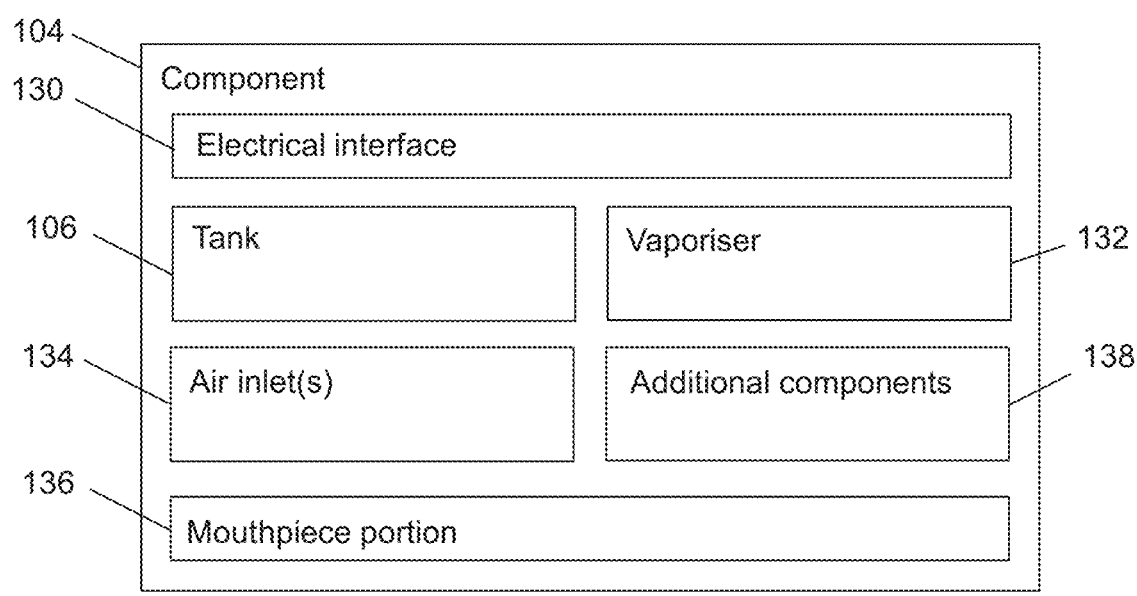
FIG. 2B is a schematic of the parts of the consumable.

FIGS. 2A and 2B are schematic drawings of the body/device 102 and consumable component 104. As is apparent from FIG. 2A, the body/device 102 includes a power source 118, a controller 120, a memory 122, a wireless interface 124, an electrical interface 126, and, optionally, one or more additional components 128.

The power source 118 is preferably a battery, more preferably a rechargeable battery. The controller 120 may include a microprocessor, for example. The memory 122 preferably includes non-volatile memory. The memory may include instructions which, when implemented, cause the controller 120 to perform certain tasks or steps of a method.

The wireless interface 124 is preferably configured to communicate wirelessly with another device, for example a mobile device, e.g., via Bluetooth®. To this end, the wireless interface 124 could include a Bluetooth® antenna. Other wireless communication interfaces, e.g., WiFi®, are also possible. The wireless interface 124 may also be configured to communicate wirelessly with a remote server.

The electrical interface 126 of the body/device 102 may include one or more connectors comprising electrical contacts. The electrical interface 126 may be located in a base of the aperture in the upper end 108 of the body/device 102. When the body/device 102 is physically coupled to the consumable component 104, the electrical interface 126 is configured to transfer electrical power from the power source 118 to the consumable component 104 (i.e., upon activation of the smoking substitute system 100).

The electrical interface 126 may also be used to identify the consumable component 104 from a list of known components. For example, the consumable component 104 may be a particular flavour and/or have a certain concentration of nicotine (which may be identified by the electrical interface 126). This can be indicated to the controller 120 of the body/device 102 when the consumable component 104 is connected to the body/device 102. Additionally, or alternatively, there may be a separate communication interface provided in the body/device 102 and a corresponding communication interface in the consumable component 104 such that, when connected, the consumable component 104 can identify itself to the body/device 102.

The electrical interface 126 may be configured to receive power from a charging station when the body/device 102 is not physically coupled to the consumable component 104 and is instead coupled to the charging station.

The additional components 128 of the body/device 102 also comprises the charging connection 115 configured to receive power from the charging station (i.e., when the power source 118 is a rechargeable battery). This may be located at the lower end 110 of the body/device 102.

The additional components 128 of the device 102 may also comprise a charging port (e.g., USB or micro-USB port) configured to receive power from the charging station (i.e., when the power source 118 is a rechargeable battery). This may be located at the lower end 110 of the device 102. Alternatively, the electrical interface 126 discussed above may be configured to act as a charging port configured to receive power from the charging station such that a separate charging port is not required.

The additional components 128 of the body/device 102 may, if the power source 118 is a rechargeable battery, include a battery charging control circuit, for controlling the charging of the rechargeable battery. However, a battery charging control circuit could equally be located in a charging station (if present).

The additional components 128 of the body/device 102 may comprise the light 116 discussed above.

The additional components 128 of the body/device 102 may include a sensor, such as an airflow (i.e., puff) sensor for detecting airflow in the smoking substitute system 100, e.g., caused by a user inhaling through a mouthpiece portion 136 of the consumable component 104. The smoking substitute system 100 may be configured to be activated when airflow is detected by the airflow sensor. This sensor could alternatively be included in the consumable component 104. The airflow sensor can be used to determine, for example, how heavily a user draws on the mouthpiece or how many times a user draws on the mouthpiece in a particular time period.

The additional components 128 of the body/device 102 may include a user input, e.g., a button. The smoking substitute system 100 may be configured to be activated when a user interacts with the user input (e.g., presses the button). This provides an alternative to the airflow sensor as a mechanism for activating the smoking substitute system 100.

As shown in FIG. 2B, the consumable component 104 includes the tank 106, an electrical interface 130, a vaporiser 132, one or more air inlets 134, a mouthpiece portion 136, and one or more additional components 138.

The electrical interface 130 of the consumable component 104 may include one or more electrical contacts. The electrical interface 126 of the body/device 102 and an electrical interface 130 of the consumable component 104 are configured to contact each other and thereby electrically couple the body/device 102 to the consumable component 104 when the lower end 111 of the consumable component 104 is inserted into the upper end 108 of the body/device 102 (as shown in FIG. 1A). In this way, electrical energy (e.g., in the form of an electrical current) is able to be supplied from the power source 118 in the body/device 102 to the vaporiser 132 in the consumable component 104.

The vaporiser 132 is configured to heat and vaporise e-liquid contained in the tank 106 using electrical energy supplied from the power source 118. As will be described further below, the vaporiser 132 includes a heating filament and a wick. The wick draws e-liquid from the tank 106 and the heating filament heats the e-liquid to vaporise the e-liquid.

The one or more air inlets 134 are preferably configured to allow air to be drawn into the smoking substitute system 100, when a user inhales through the mouthpiece portion 136. When the consumable component 104 is physically coupled to the body/device 102, the air inlets 134 receive air, which flows to the air inlets 134 along a gap between the body/device 102 and the lower end 111 of the consumable component 104.

In operation, a user activates the smoking substitute system 100, e.g., through interaction with a user input forming part of the body/device 102 or by inhaling through the mouthpiece portion 136 as described above. Upon activation, the controller 120 may supply electrical energy from the power source 118 to the vaporiser 132 (via electrical interfaces 126, 130), which may cause the vaporiser 132 to heat e-liquid drawn from the tank 106 to produce a vapour which is inhaled by a user through the mouthpiece portion 136.

An example of one of the one or more additional components 138 of the consumable component 104 is an interface for obtaining an identifier of the consumable component 104. As discussed above, this interface may be, for example, an RFID reader, a barcode, a QR code reader, or an electronic interface which is able to identify the consumable. The consumable component 104 may, therefore include any one or more of an RFID chip, a barcode or QR code, or memory within which is an identifier and which can be interrogated via the electronic interface in the body/device 102.

It should be appreciated that the smoking substitute system 100 shown in FIGS. 1A to 2B is just one exemplary implementation of a smoking substitute system. For example, the system could otherwise be in the form of an entirely disposable (single-use) system or an open system in which the tank is refillable (rather than replaceable).

Figure 3:
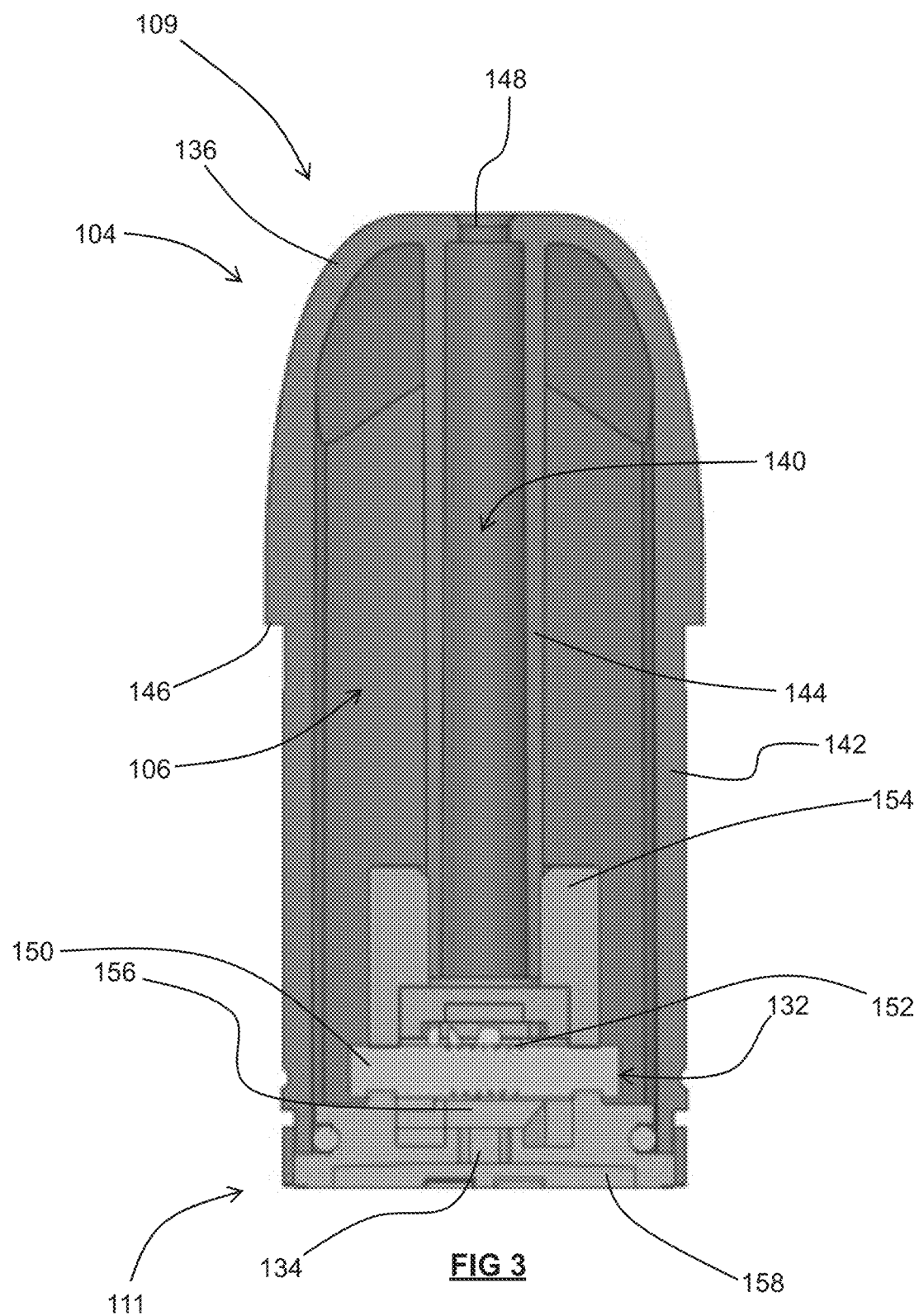
FIG. 3 is a section view of the component.

FIG. 3 is a section view of an example of the consumable component 104 described above. The consumable component 104 comprises a tank 106 for storing e-liquid, a mouthpiece portion 136 and a conduit 140 extending along a longitudinal axis of the consumable component 104. In the illustrated embodiment the conduit 140 is in the form of a tube having a substantially circular transverse cross-section (i.e., transverse to the longitudinal axis). The tank 106 surrounds the conduit 140, such that the conduit 140 extends centrally through the tank 106.

A tank housing 142 of the tank 106 defines an outer casing of the consumable component 104, whilst a conduit wall 144 defines the conduit 140. The tank housing 142 extends from the lower end 111 of the consumable component 104 to the mouthpiece portion 136 at the upper end 109 of the consumable component 104. At the junction between the mouthpiece portion 136 and the tank housing 142, the mouthpiece portion 136 is wider than the tank housing 142, so as to define a lip 146 that overhangs the tank housing 142. This lip 146 acts as a stop feature when the consumable component 104 is inserted into the body/device 102 (i.e., by contact with an upper edge of the body/device 102).

The tank 106, the conduit 140 and the mouthpiece portion 136 are integrally formed with each other so as to form a single unitary component and may, e.g., be formed by way of an injection moulding process. Such a component may be formed of a thermoplastic material such as polypropylene.

The mouthpiece portion 136 comprises a mouthpiece aperture 148 defining an outlet of the conduit 140. The vaporiser 132 is fluidly connected to the mouthpiece aperture 148 and is located in a vaporising chamber 156 of the consumable component 104. The vaporising chamber 156 is downstream of the inlet 134 of the consumable component 104 and is fluidly connected to the mouthpiece aperture 148 (i.e., outlet) by the conduit 140.

The vaporiser 132 comprises a porous wick 150 and a heater filament 152 coiled around the porous wick 150. The wick 150 extends transversely across the chamber vaporising 156 between sidewalls of the chamber 156 which form part of an inner sleeve 154 of an insert 158 that defines the lower end 111 of the consumable component 104 that connects with the body/device 102. The insert 158 is inserted into an open lower end of the tank 106 so as to seal against the tank housing 142.

In this way, the inner sleeve 154 projects into the tank 106 and seals with the conduit 140 (around the conduit wall 144) so as to separate the vaporising chamber 156 from the e-liquid in the tank 106. Ends of the wick 150 project through apertures in the inner sleeve 154 and into the tank 106 so as to be in contact with the e-liquid in the tank 106. In this way, e-liquid is transported along the wick 150 (e.g., by capillary action) to a central portion of the wick 150 that is exposed to airflow through the vaporising chamber 156.

The transported e-liquid is heated by the heater filament 152 (when activated, e.g., by detection of inhalation), which causes the e-liquid to be vaporised and to be entrained in air flowing past the wick 150. This vaporised liquid may cool to form an aerosol in the conduit 140, which may then be inhaled by a user.

Figure 4:
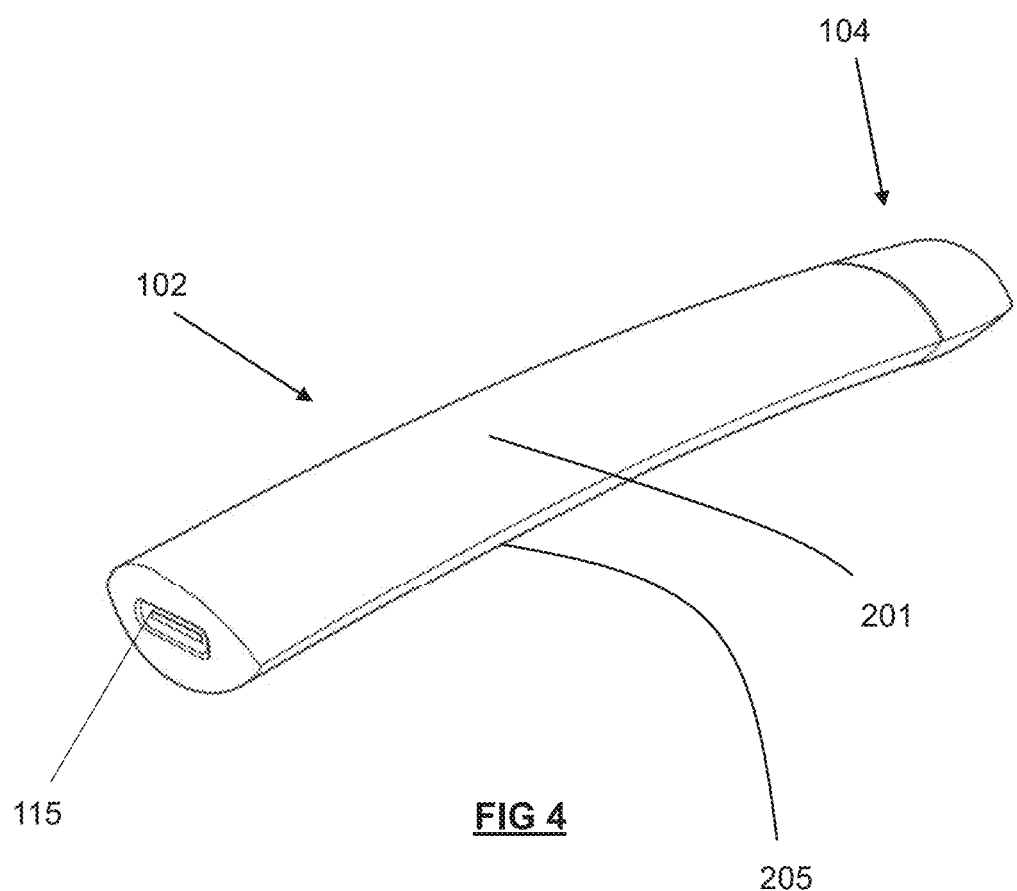
FIG. 4 is a perspective view of an embodiment of the apparatus.

FIG. 4 shows a perspective view of an embodiment of the body/device 102 engaged with the consumable component 104 at the upper end 108. The body/device 102 includes a charging connection 115 at the lower end 110.

The front surface 201 of the body/device 102 is curved in the transverse dimension. The rear surface 202 of the body/device 102 is curved in the transverse dimension. The curvatures of the front surface 201 and rear surface 202 are of the opposite sense to one another. Both front and rear surfaces 201, 202 are convex in the transverse dimension. This leads to a mandorla-/lemon-/eye-shaped cross sectional shape of the body/device 102.

The front surface 201 and rear surface 202 meet at two transverse edges 205. The transverse edges 205 have a radius of curvature that is significantly smaller than the radius of curvature of either the front 201 or rear surface 202. This leads to the transverse edges being substantially "pointed" or "sharp". The transverse edges may have a radius of curvature in the transverse dimension of less than 1 millimetre.

As illustrated in FIG. 4, the transverse edges 205 extend substantially the full longitudinal length of the body/device 102.

The front surface 201 of the body/device 102 may include an illumination region through which at least one light source may be visible.

Figure 5:
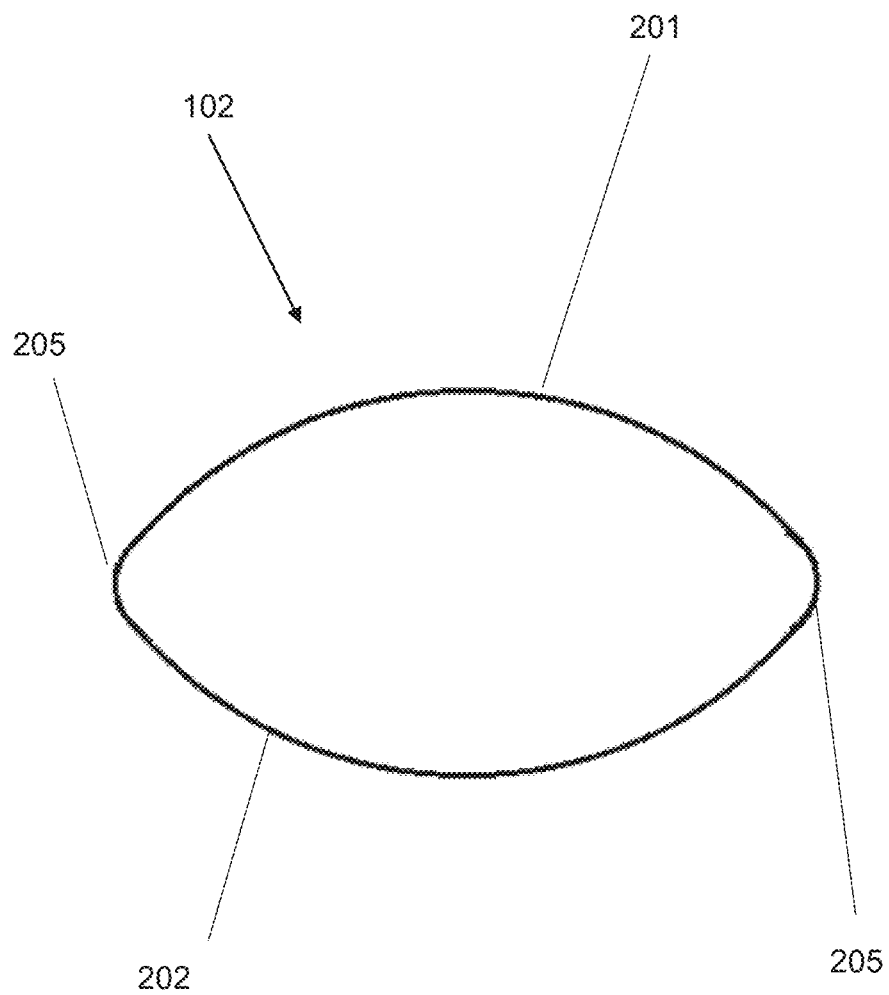
FIG. 5 is a schematic transverse cross-section view of the body of FIG. 4.

FIG. 5 illustrates a schematic transverse cross section through the body/device 102 of FIG. 4, in accordance with an embodiment. The front surface 201 and rear surface 202 are shown meeting at the transverse edges 205 on either side of the body/device 102. The radius of curvature in the transverse dimension of the front surface 201 is equal to the radius of curvature in the transverse dimension of the rear surface 202.

The push-push connection 300 is shown in more detail in FIG. 6-9. In the exemplary embodiments, the push-push connection comprises a means to enable the consumable to be pushed relative to the body to engage the body and pushed again relative to the body to disengage the consumable and body. For instance, the push-push connection is shown as a push-push mechanism 300. As shown in FIG. 6, the push-push mechanism comprises a receiving member 302 and an insertion member 304. The insertion member is shown as being arranged on the consumable component 104 and the receiving member 302 connected to the body/device 102. However, it will be appreciated that the members may be reversed. In the exemplary embodiment of the body, the body comprises a recess 306 in which the consumable is inserted. Here, the receiving member is shown as being connected to an inside side surface of the recess 306. The consumable is inserted into the recess. For instance, by relative movement in an axial direction of the body. Suitably, when the consumable is partially inserted into the recess, the inserting member is engaged with the receiving member. As shown in FIG. 7, when the push-push mechanism is engaged, a space is reserved between the consumable and body, in which the consumable is able to move to complete the second push action to disengage the push-push mechanism.

As mentioned, in some embodiments the consumable is required to be electrically connected to the body to power a heater on the consumable. In addition, the body may include a number of active electronic components that interrogate passive components on the consumable, each also requiring further electrical connection. As the number of electrical connections required increases, it becomes more difficult to provide the electrical connections with established connections such as pogo pins etc. Thus, in some exemplary embodiments, the push-push mechanism is configured to also provide the electrical interface between the consumable and body. By combining the push-push mechanism with the electrical connection it is envisaged more connections can be reliably made between the consumable and body.

Push-push mechanisms are known in remote technical fields such as the connection of sim cards to mobile telephones. A variety of push-push mechanism are therefore suitable. But in one exemplary embodiment, the push-push mechanism includes a biasing member, such as a spring or other resilient element to bias the insertion member away from the receiving member in the second direction, opposed to the first (i.e., in a pull direction). The first push action therefore urges the insertion member into the receiving member against the bias of the spring. When the insertion member of other part reaches a stop, the pushing force is released from the consumable and the insertion member urged in the second direction by the bias and to hook or catch the insertion member to the receiving member. The consumable can then be urged back against the bias by the second push action, which moves the insertion member relative to the receiving member in the first direction, before again reaching a stop. Releasing the push force on the consumable, allows the insertion member to move back in the second direction and to be released from the receiving member.

In the exemplary embodiment, the insertion member travels along a first path as the insertion member enters the receiving member and travels relatively in the first direction. Here the receiving member guides the insertion member along a first path. For instance, the insertion member is guided by a first track. When reaching the stop, the insertion member is guided to follow a second path when moving in the second direction. For instance, the follower may be moveably connected to a body of the insertion member, and the follower is moved or bent to follow the second path. The second path is different to the first path. That is, it is not the reverse of the first path. Thus, rather than leading to an exit from the receiving member, the second path leads the follower to a catch or hook so that the follower is retained in the receiving member. Thus, the follower is prevented from further moving in the second direction and consequently, the follower prevents withdrawal of the consumable from the recess.

From the captured or retained position, the second push action moves the follower away from the catch in the first direction and a long a third path. The third path may be different to the second path (i.e., the follower is moved again to not follow the reverse of the second path) or the third path may be the reverse of the second path. When reaching the stop, the insertion member is guided to follow a fourth path when moving in the second direction. The fourth path leads to an exit from the receiving member (i.e., an exit from the guide track). The fourth path may be different to the first path, for instance by causing the follower to move laterally, or the fourth path may be the reverse of the first path.

As an alternative embodiment, FIGS. 8 and 9 show an example of an aerosol generating apparatus for generating an aerosol from a solid percursor. Here, the consumable comprises a stick. Although the stick could be adapted to include a push-push connection member as with the liquid percussor embodiment, where it is desirable to not adapt the stick, a carrier 310 may be arranged within the recess of the body. Here, the push-push mechanism is configured between the carrier and the body. Unlike the consumable in the liquid percussor embodiment, the carrier 310 may not be separable from the body when the follower is at the start of the first path or the ned of the fourth path. But the carrier 310 is moveable relative to the body in a push-push configuration to capture and release an insertion member into a receiving member as herein described. In addition, the carrier member comprises a gripping means such as an actuatable restriction 309. Here, the push-push connection is configured to actuate the restriction (i.e., move the restriction) when the insertion member is captured by the receiving member so that a restriction is applied to the consumable. And the push-push connection is configured to remove the restriction when the insertion member is released.

Figure 10A:
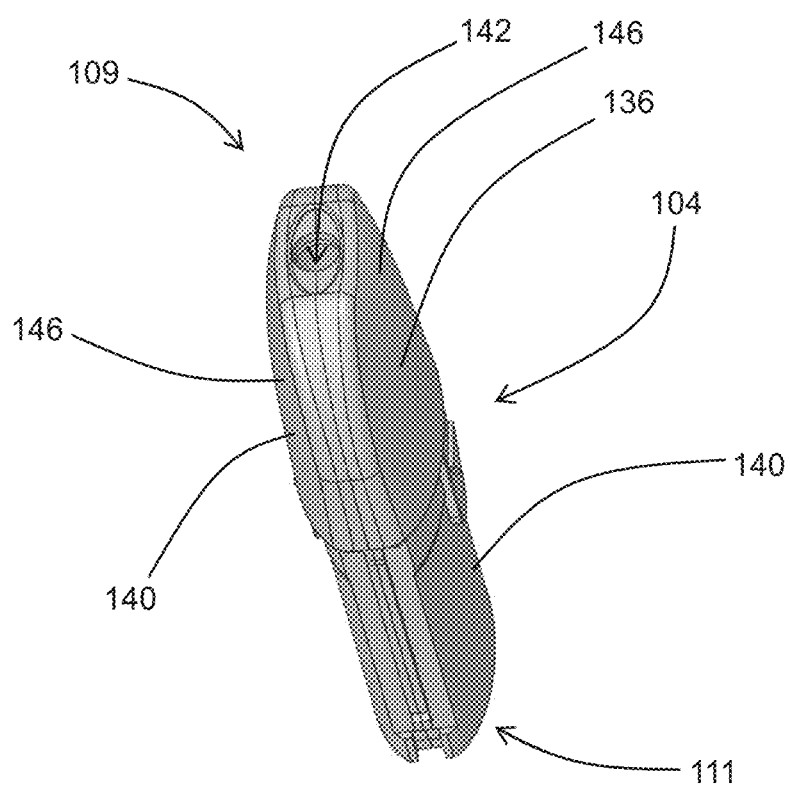
FIGS. 10A and 10B are perspective and bottom views of the aerosol delivery component.
Figure 10B:
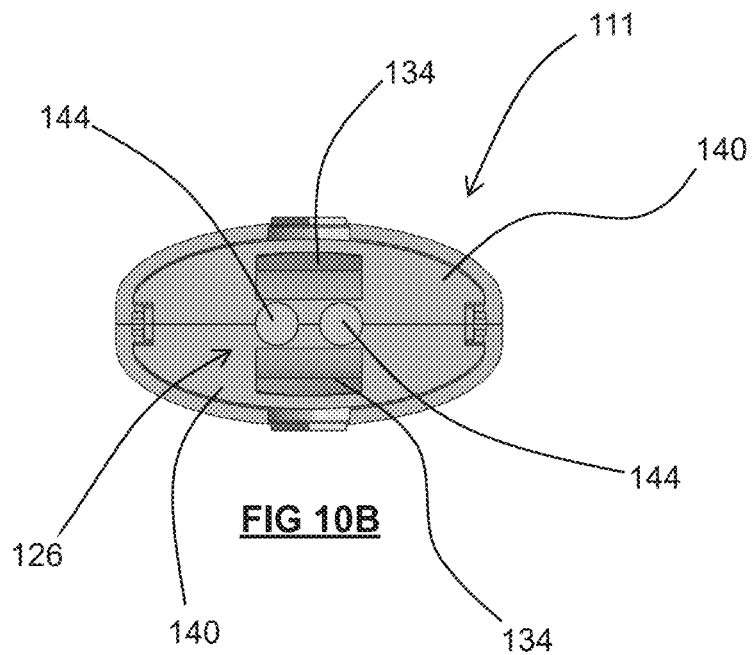

FIGS. 10A and 10B illustrate the consumable component 104 of FIG. 1A to 1B in more detail. Although not immediately apparent from the figure, the consumable component 104 (i.e., aerosol delivery component) is formed of two (e.g., first and second) identical component parts 140 that are joined together to form the consumable component 104. Referring, in particular, to FIG. 10B, the components parts 140 are joined along a plane that is horizontal and extends into the page. The component parts 140 will be described in more detail below with respect to FIG. 11.

FIG. 10A is a perspective view that is oriented so as to show the upper end 109 of the consumable component 104. As is apparent from this view, the upper end 109 comprises an outlet 142, which forms part of the mouthpiece 136, and from which a user may inhale an aerosol produced by the consumable component 104. The mouthpiece 136 forms part of a housing of the component 104, which is formed of outer walls 146 of the component parts 140.

FIG. 10B shows the lower end 111 of the consumable component 104. This shows, in particular, the electrical interface 126, which comprises a pair of electrical connectors 144. As is discussed above, these allow electrical connection of the consumable component 104 to a smoking substitute device (e.g., for the purpose of providing power to the consumable component 104). This figure also illustrates two inlets 134 formed in the lower end 111 of the consumable component 104. These inlets 134 are spaced either side of the electrical connectors 144, such that each inlet 134 is formed in a respective one of the component parts 140.

The inlets 134 are generally rectangular in shape and, although not apparent from FIGS. 3A and 3B, they open to a singular passage extending through the consumable component 104 to the outlet 142. Thus, the inlets 134 are in fluid communication with the outlet 142 and inhalation at the outlet 142 results in airflow into the inlets 134.

FIG. 11 shows a component part 140 used to form the consumable component 104 shown in FIGS. 3A and 3B. The illustrated face of the component part 140 (i.e., parallel to the page) in FIG. 11 is the face along which the component part 140 is joined with a like-component part to form the consumable component 104.

The outer wall 146 of the component forms a shell that defines a cavity including a passage recess 148, and first 150a and second 15b reservoir recesses.

The passage recess 142 is arranged such that, when the component part 140 is joined with a like-component part the passage recesses 142 combines with that of the component part 140 to define the airflow passage extending through the component 104. Thus, the passage recess 142 is elongate and extends centrally along a longitudinal axis of the component part 140.

In particular the passage extends from the inlets 134 (shown in FIG. 10B) to the outlet 142 (shown in FIG. 10A). The component part 140 comprises an outlet portion 147 that combines with the outlet portion of a like-component, when joined, to form the outlet 142. The outlet portion 147 is in the form of a semi-circular slot formed in an edge of outer wall 146 at the upper end 109 of the component part 140.

A filter retaining portion 168 of the passage recess 148 is disposed adjacent the outlet portion 147. This is an enlarged portion of the passage recess 148 that is configured to retain a filter (i.e., a correspondingly shaped filter) therein when the component part 140 is joined with a like-component part.

The reservoir recesses 150a, 150b are elongate, and extend longitudinally either side of the passage recess 148. Thus, the reservoir recesses 150a, 150b are separated from one another by the passage recess 148. As should be apparent from FIG. 11, when the component part 140 is joined with a like-component part, each of the reservoir recesses 150a, 150b combines with a corresponding reservoir recess of the like-component to define a reservoir in the component 104. These reservoirs of the component 104 are then fillable with an aerosol precursor (e.g., an e-liquid).

The component part 140 also comprises first 152a and second 152b separator walls. The first separator wall 152a separates the first reservoir recess 150a from the passage recess 148 and the second separator wall 152b separates the second reservoir recess 150b from the passage recess 148.

Each of the separator walls 152a, 152b projects (inwardly) from an internal side of the outer wall 146 of the component part 140. Thus, in essence, the separator walls 152a, 152b divide the cavity defined by the outer wall into the passage 148 and reservoir recesses 150a, 150b. In this way, the passage recess 148 is defined by surfaces of the outer wall 146 and the separator walls 150a, 150b. As a result, the passage recess 148 has a substantially rectangular cross-sectional shape.

The separator walls 152a, 152b each extend in the longitudinal direction substantially for the length of the component part 140. The height of each separator wall 152a, 152b from the internal side of the outer wall 146 is such that, when the component part 140 is joined with a like-component part 140, the distal edges (distal from the internal side) of the separator walls 152a, 152b join so as to device a cavity defined by the component parts 140 into the passage and the two reservoirs.

When joined in this manner, the reservoirs that are forms are separate from one another and are sealed for storage of aerosol precursor. The component part 140 comprises a supply inlet 166 formed therein for filling the reservoirs. The supply inlet 166 is in the form of an aperture formed in a portion of the outer wall 146 that defines the first reservoir recess 150a. As should be appreciated, such an arrangement provides two apertures when the component 104 is formed, each for filling one of the two reservoirs of the component 104. The supply inlet 166 may be sealed (e.g., by ultrasonic welding) once the reservoirs are filled. Alternatively, the supply inlet 166 may comprise a valve to prevent leakage of aerosol precursor therefrom.

An alternative solution is to provide a sealing diaphragm for sealing over each of the reservoir recesses 150a, 150b and to retain aerosol precursor in the recesses 150a, 150b.

This can subsequently be broken, removed or may disintegrate upon joining of the component part 140 to a like-component part.

Each separator wall 152a, 152b comprises a vaporiser locating portion 154 in the form of a semi-circular slot formed in distal edge thereof. These vaporiser locating portions 154 are disposed proximate the lower end 111 of the component part 140 (i.e., so as to proximate to the inlet 134), and are positioned so as to directly oppose one another across the passage recess 148.

The vaporiser locating portions 153 are each configured for receipt of a respective end portion of a porous wick 156 of the vaporiser 132. In this way, the wick 156, when received in the vaporiser locating portions 154, extends transversely across the passage recess 148. A heater filament 158 of the vaporiser 132 is coiled about the portion of the wick 156 that spans the passage recess 148. When the component part 140 is joined with a like-component part, the wick 156 is captured in the vaporiser locating portions 154 (i.e., slots) of the component part and the like-component part so as to be retained in the position shown in FIG. 11.

The component part 140 also comprises connector locating portions 160 for receipt of connectors of the consumable component 104. Each connector locating portion 160 is in the form of a semi-circular slot and seats a narrowed portion of an electrical connector 162 (i.e., an electrical contact forming part of the electrical interface). When the component part 140 is joined to a like-component part, the connectors 162 are thus held between the component parts 140 in the connector locating portions 160.

In other embodiments, each connector locating portion 160 and each corresponding narrowed portion of a connector 162 may have a non-circular cross-sectional shape, which may restrict rotation of the connector 162. Alternatively, each connector locating portion 160 may comprise a retaining feature (such as a protrusion) that engages the connector 162 to prevent rotation of the connector 162. This may be desirable where the component part 140 is joined to a like-component part using ultrasonic welding. The vibrations imparted on the component parts 140 during such welding could otherwise result in rotation (or dislodgement) of the connectors 162.

Each of the connectors 162 is electrically connected to the heater filament 158, such that upon receipt of a power supply from, e.g., a power source of a smoking substitute device, the power is supplied from the connectors 162 to the heater filament 158.

As is set forth above, the component part 140 is joined with a like-component part to form the component 104 as shown in FIGS. 10A and 10B. In particular, the joining occurs along the distal edges of the separator walls 152a, 152b and along a periphery of the outer wall 146. These all lie in substantially the same plane (i.e., parallel to the page), such that the joining generally occurs along a single joining plane.

To facilitate the joining of the component part 140 with a like-component part, the component part 140 comprises an energy director in the form of a pointed rib 164 (i.e., having a pointed apex). The rib 164 extends about a periphery of the first reservoir recess 150a (i.e., along the distal edge of the first separator wall 152a and a portion of the periphery of the outer wall 146). The extension of the energy director 164 about the periphery of the first reservoir recess 150a ensures that the corresponding reservoir is adequately sealed upon joining of the component part 140 to a like-component part. As should be appreciated, the energy director of the like-component part abuts, and seals, the periphery of the second reservoir recess 150b upon joining of the components 140. The component part 140 is symmetrical about a central longitudinal axis, except for the presence of the energy director 164.

Thus, in general the component 104, as shown in FIGS. 10A and 10B may be formed by providing two identical component parts 140 as shown in FIG. 11. Each component part 140 may be formed by a moulding process (e.g., an injection moulding process). Due to shape of each component part 140, the forming process may be performed with a straight pull mould (e.g., without side-actions).

A vaporiser 132 and connectors 160 are positioned between the component parts 140, which are then joined to one another by using, e.g., an ultrasonic welding process. The supply inlets 166 of the component parts 140, may then subsequently be used to fill each reservoir of the component 104 with aerosol precursor. After filling, the supply inlets 166 may be sealed through a further ultrasonic welding process.

This process involves very small number of different parts, which minimises the tooling required to produce an aerosol delivery component. This results in a more cost effective and less complex aerosol delivery component, and one having less joins susceptible to aerosol precursor leakage.

FIG. 12 illustrates a component part 140' that is a variation of the component part 140 shown in FIG. 11. This component part 140' includes many of the features of those of the component part 140 of FIG. 4 and, for that reason, corresponding reference numerals have been used.

The illustrated component part 140' differs in that it comprises only one reservoir recess 150 and the passage recess 148 does not extend centrally through the component part 140' (it instead extends along one side of the component part 140'). Thus, the component part 140' also includes a single separator wall 152 that separate the passage recess 148 from the reservoir recess 150.

Unlike the previously described embodiment, this component part 140' cannot be joined with a like-component, because it is not symmetrical. Rather, the component part 140' is joined with a second component part 140' in which the features are flipped about the longitudinal axis.

Figure 14:
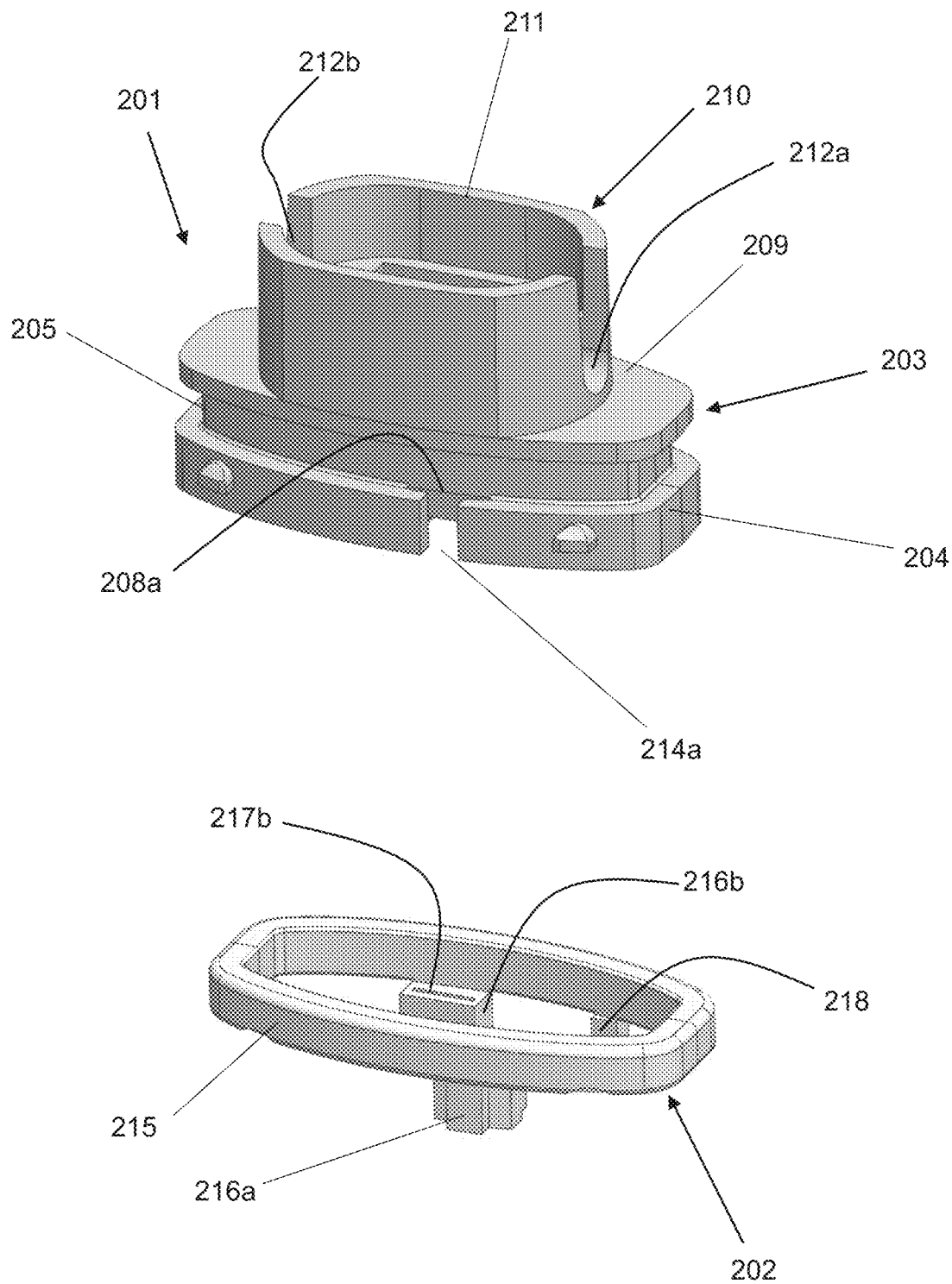
FIG. 14 shows a separated vaporiser support and gasket portion formed by the method of FIGS. 13A-D.

FIGS. 13A-D shows a method of manufacturing a base portion 200 for the component 104. A first mould 301 and second mould 302 are provided in a single press 300 which is sealed. Polypropylene is injected into the first mould to form a rigid plastic vaporiser support 201 which is shown in FIG. 14.

The vaporiser support 201 comprises end portion 203 having a longitudinally-extending perimeter wall 204. The longitudinally-extending perimeter wall 204 comprises a perimeter groove 205 extending entirely around the perimeter wall 204 of the end portion 203.

The vaporiser support 201 comprises a longitudinally-extending moulding gate 206 (seen in FIG. 16) in the perimeter wall 204 of the end portion 203 extending between an end face 207 of the end portion 203 and the perimeter groove 205. The moulding gate 206 comprises a longitudinally-extending channel recessed into the perimeter wall 204.

The end portion 203 comprises a pair of apertures 208a, 208b (only one visible in FIG. 14) extending from the end face 207 to an opposing inner face 209 of the end portion 203. The inner face 209 of the end portion 203 comprises a support portion 210 for supporting a wick 213 (shown in FIG. 15). The support portion 210 is upstanding from the inner face 209 of the end portion 203 and comprises an annular wall 211 having opposing channels 212a, 212b for receiving the wick 213.

The perimeter wall 204 of the end portion 204 comprises two longitudinally-extending gasket channels 214a, 214b (distinct and remote from the moulding gate 206) extending from the perimeter groove 205 to the end face 207 proximal the apertures 208a, 208b.

After opening the press 300, the vaporiser support 201 is moved using a robotic arm from the first mould 301 to the second mould 302 (step 2 in FIG. 13B).

Figure 15:
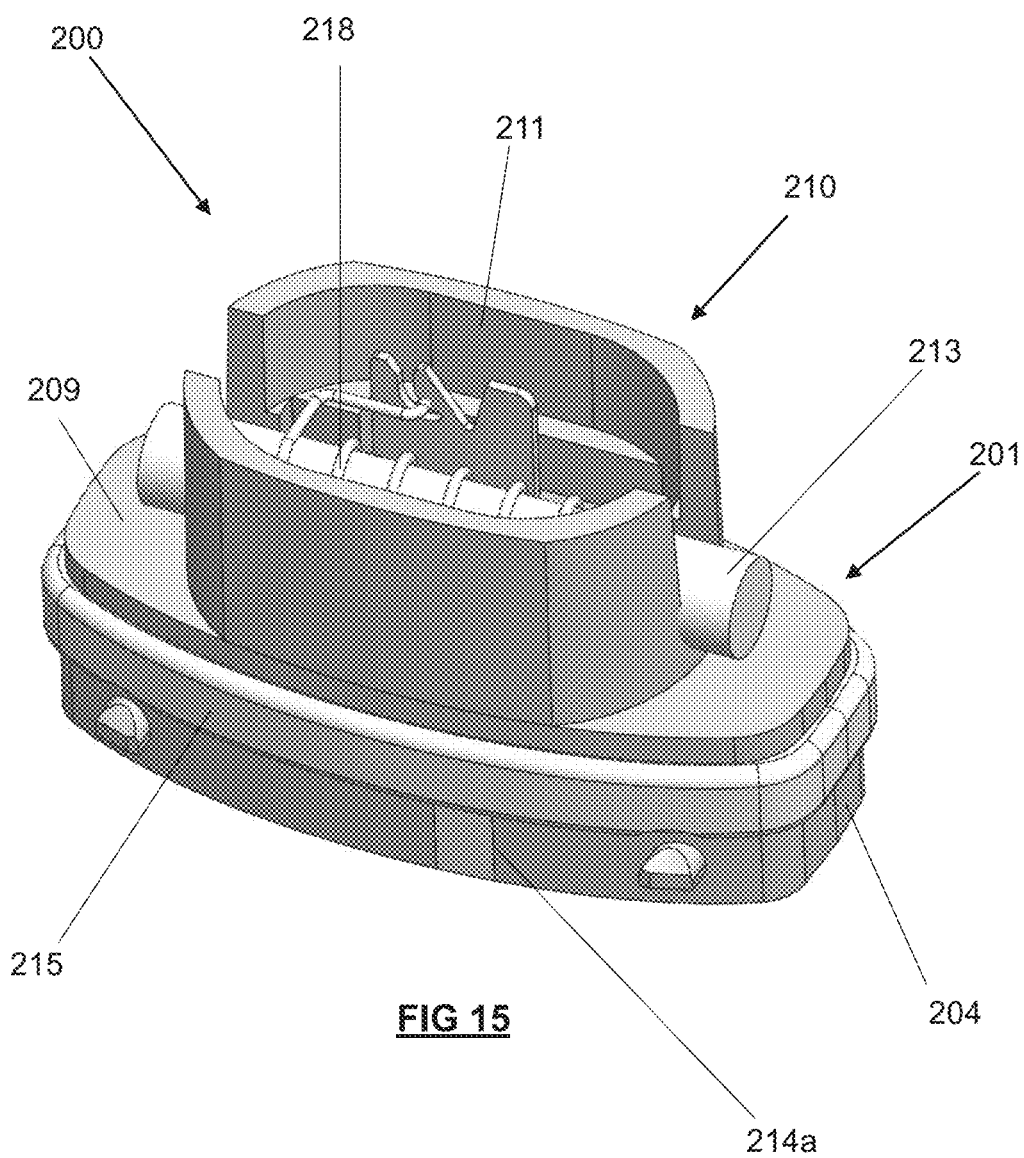
FIG. 15 shows the integrally formed base portion in an upright orientation.
Figure 16:
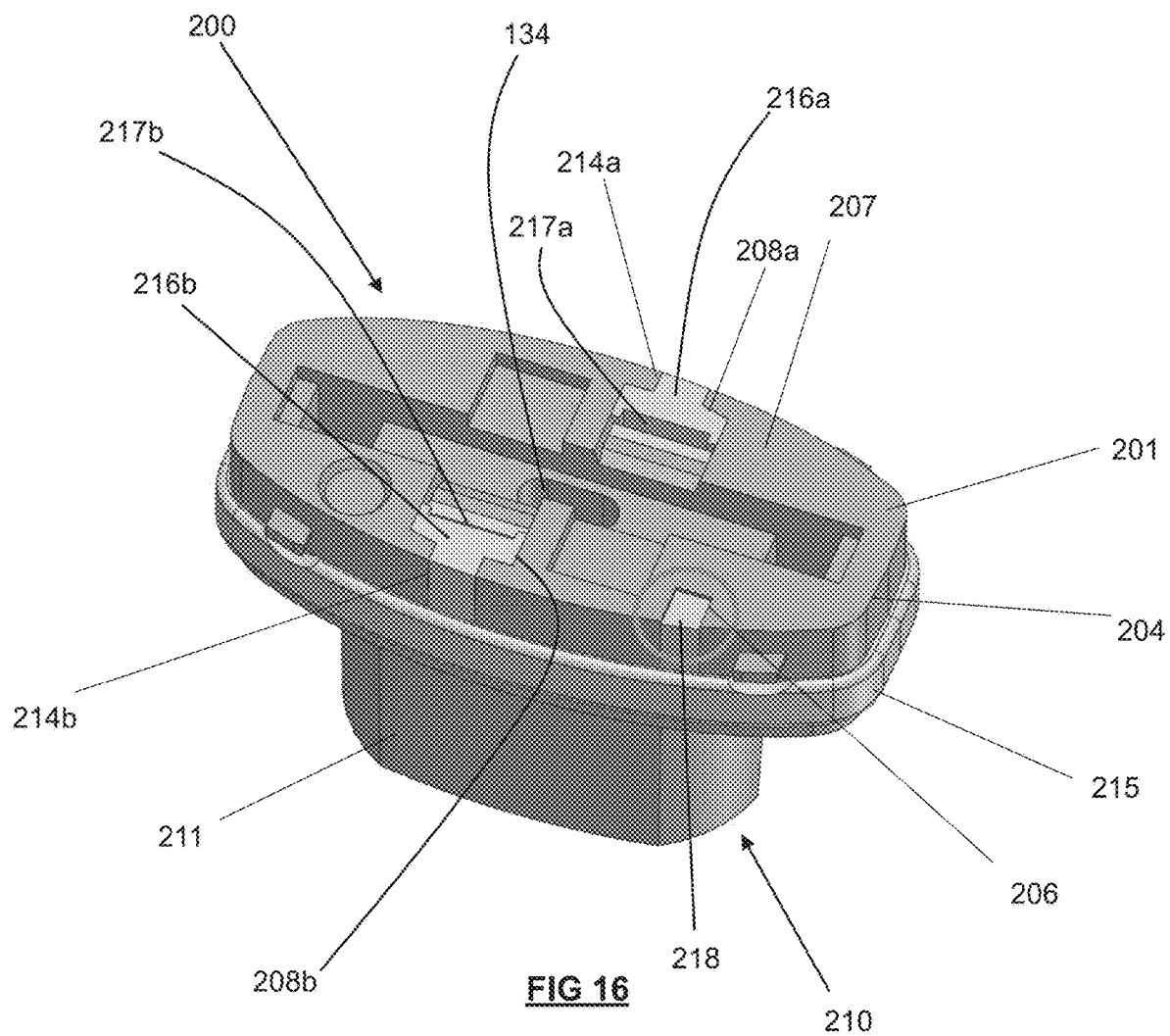
FIG. 16 shows the base portion in an inverted configuration.

The press 300 is re-sealed and thermoplastic polyurethane is injected into the second mould 302 (step 3 in FIG. 13C) to form the over-moulded compressible gasket portion 202 which is shown in FIG. 14. The polyurethane is injected into the moulding gate 206 and flows into the perimeter groove to form a perimeter gasket 215 which is encircles the perimeter wall 204 of the end portion 203 of the vaporiser support 201 as seen in FIGS. 15 and 16. The perimeter gasket 215 extends radially/laterally from the perimeter wall 204, i.e., is proud of the surface of the perimeter wall 204.

After flowing into the perimeter groove 205 to form the perimeter gasket 215, the polyurethane flows into the two gasket channels 214a, 214b which are in fluid communication with the apertures 208a, 208b to form two contact gaskets 216a, 216b which fill the gasket channels 214a, 214b and the apertures 208a, 208b. The contact gaskets 216a, 216b each have a respective gasket aperture 217a, 217b. The moulding gate 206 of the vaporiser support is filled with a gate portion 218 of the gasket portion 202.

Finally, the base portion 200 comprising the vaporiser support 201 and the gasket portion 202 is removed from the press 300 using the robotic arm (e.g., shown in FIG. 13D).

After removal of the base portion 200 from the second mould 302, the perimeter gasket 215 is sealed against the inner surface of a tank housing (not shown).

The air inlet 134 is provided in the end face 207 of the end portion and extends through the end portion to the inner face 209 within the annular wall 211 of the support portion 210. The annular wall 211 defines a vaporising chamber in which the wick 213 and coiled heating element 218 is mounted and through which airflow passes from the inlet 134 to an outlet in a mouthpiece portion (not shown).

Figure 17:
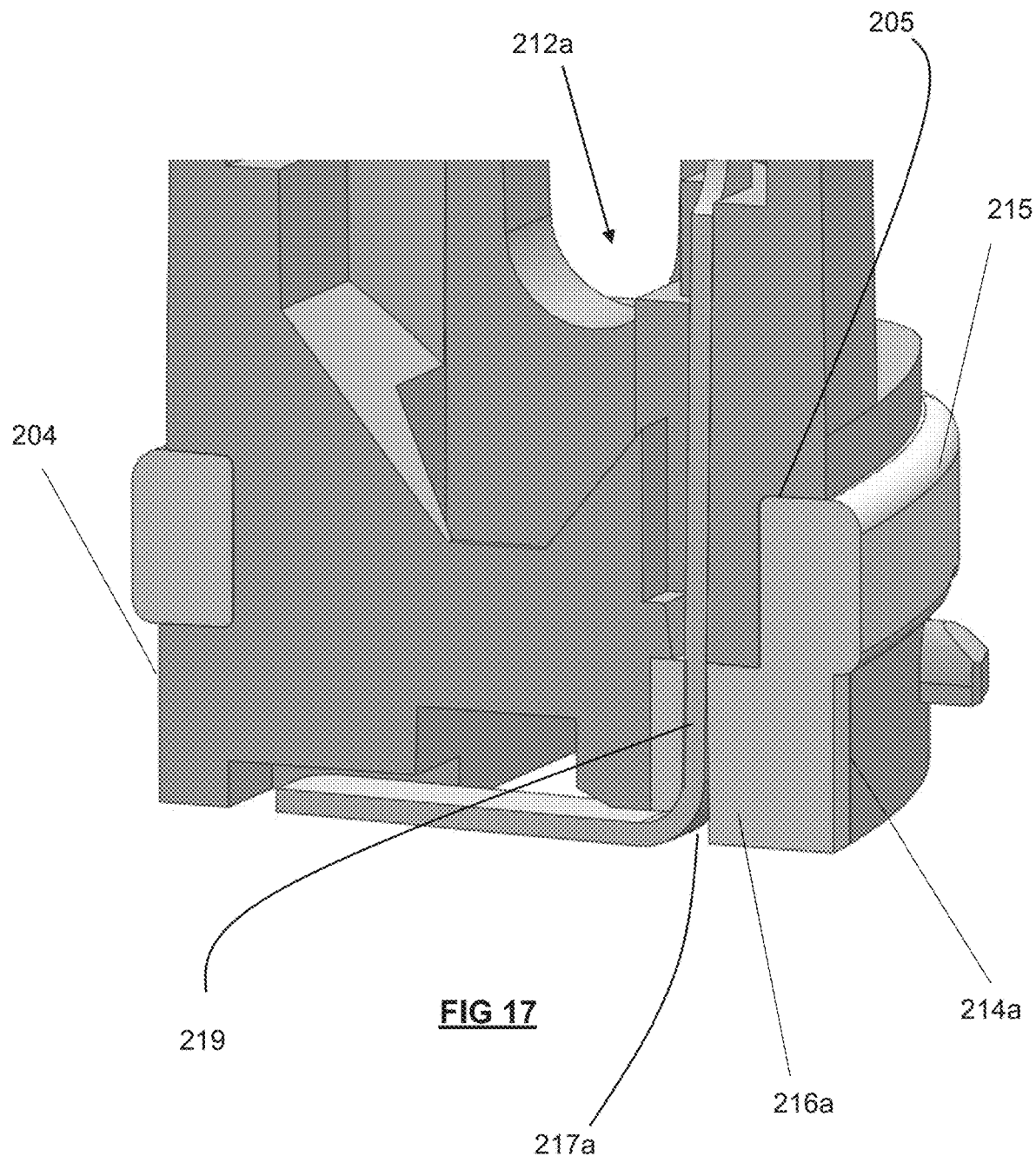
FIG. 17 shows a cross section through the base portion.

Electrical contacts (only one shown) 219 are inserted through each of the gasket apertures 218a, 219b (as shown in FIG. 17) for connection with the heating element 218.

In this way, the perimeter gasket 215 and the contact gaskets 216a, 216b seal both the tank and the electrical contacts and are formed in a single injection moulding step.

As can be seen in step 3 of FIG. 13C as the polyurethane is injected into the second mould 302, polypropylene may be injected into the first mould 301 to form a second rigid plastic vaporiser support 201'. The second vaporiser support 201' may then be moved (e.g., using the robotic arm) to the second mould 302 after the base portion 200 has been removed from the second mould 302 for subsequent injection of polyurethane into the second mould 302 to form a second base portion 200'.

As will be appreciated the embodiments described herein provide an aerosol generating apparatus wherein a consumable is engaged with a body via a push-push mechanism. Adapting a push-push mechanism for an aerosol generating apparatus provides an improved user experience by providing an improved connection between the consumable and body and also a fiddle factor to the apparatus to be enjoyed by the user.

Non-Limiting Illustrative Embodiments

Further aspects and embodiment are described with reference to the following numbered paragraphs:

1. A kit of parts for forming an aerosol delivery component for a substitute smoking system, the kit of parts comprising first and second moulded component parts configured such that, when joined together, the first and second moulded component parts define an airflow passage and aerosol precursor reservoir therebetween.

2. A kit of parts according to paragraph 1 wherein the first component part is substantially the same as the second component part.

3. A kit of parts according to paragraph 1 or 2 wherein the first and second component parts are configured to be joined along a joining plane parallel to a longitudinal axis of the airflow passage when formed.

4. A kit of parts according to any one of paragraphs 1 to 3 wherein each component part comprises a passage recess formed therein, the passage recesses arranged such that, when the components parts are joined, the passage recesses combine to define an airflow passage.

5. A kit of parts according to paragraph 4 wherein each component parts comprises a reservoir recess formed therein, the reservoir recesses arranged such that, when the components parts are joined, the reservoir recesses combine to define a reservoir for storing aerosol precursor.

6. A kit of parts according to paragraph 5 wherein each component part comprises a separator wall that separates the passage recess from the reservoir recess.

7. A kit of parts according to paragraph 6 wherein each component part comprises an outer wall, the outer wall comprising an external side defining an outer surface of the component when the component parts are joined, and an internal side from which the separator wall projects.

8. A kit of parts according to paragraph 7 wherein each component part comprises a supply inlet formed in a portion of the outer wall defining the reservoir recess.

9. A kit of parts according to paragraph 5 wherein the reservoir recess of each component part is a first reservoir recess and each component part further comprises a second reservoir recess, the first and second reservoir recesses of each component part disposed either side of the passage recess of the component part.

10. A kit of parts according to any one of paragraphs 1 to 9 wherein the component parts are configured to retain a vaporiser therebetween when joined.

11. A method of forming an aerosol delivery component for a substitute smoking system, the method comprising:
moulding a first component part;
moulding a second component part;
joining the first and second component parts to one another such that, when joined together, the first and second component parts define an airflow passage and an aerosol precursor reservoir therebetween.

12. A method according to paragraph 11 wherein the steps of moulding the first and second component parts comprises injection moulding the first and second components parts.

13. A method according to paragraph 11 or 12 wherein the step of joining the first and second component parts comprises welding the first and second component parts together using an ultrasonic welding process.

14. A method according to any one of paragraphs 11 to 13 comprising, subsequent to joining the first and second component parts, filling one or more aerosol precursor reservoirs defined between the first and second component parts, and, optionally, subsequent to filling the one or more aerosol precursor reservoirs, sealing (e.g., welding) the one or more aerosol precursor reservoirs.

15. A component produced by the method according to any one of paragraphs 11 to 14.

16. A method of manufacturing a base portion for an aerosol delivery component (e.g., a smoking substitute component), the method comprising the steps of:
    injecting a first plastic into a first mould to form a rigid plastic vaporiser support;
    transferring the vaporiser support to a second mould; and
    injecting a second plastic into the second mould to form a compressible sealing gasket portion on the vaporiser support to thereby form the base portion.

17. A method according to paragraph 16 comprising injecting the first plastic into the first mould so as to form a rigid plastic vaporiser support having an end portion comprising a longitudinally-extending perimeter wall having a perimeter groove.

18. A method according to paragraph 17 comprising injecting the first plastic into the first mould so as to form a longitudinally-extending moulding gate in the perimeter wall of the end portion.

19. A method according to paragraph 17 or 18 comprising injecting the second plastic to form a perimeter gasket in the perimeter groove of the end portion of the vaporiser support.

20. A method according to any one of paragraph 17 to 19 comprising injecting the first plastic into the first mould so that the end portion comprises at least one aperture and subsequently injecting the second plastic to form a contact gasket in the at least one aperture.

21. A method according to any one of paragraphs 16 to 20 wherein the first and second moulds are provided in a single press.

22. A method according to any one of paragraphs 16 to 21 wherein as the second plastic is injected into the second mould, the first plastic is injected into the first mould to form a second rigid plastic vaporiser support.

23. An integrally moulded base portion for an aerosol delivery component, the base portion comprising:
    a vaporiser support formed of a rigid plastic; and
    a sealing gasket portion formed of compressible plastic over-moulded on the vaporiser support for sealing against an internal surface of the aerosol delivery component.

24. A base portion according to paragraph 23 wherein the vaporiser support comprises an end portion with a longitudinally-extending perimeter wall having a perimeter groove and wherein the sealing gasket comprises a perimeter gasket located in the perimeter groove.

25. A base portion according to paragraph 24 wherein the perimeter comprises a longitudinally-extending moulding gate extending between an end face of the end portion and the perimeter groove wherein the moulding gate is filled with the compressible plastic.

26. A base portion according to paragraph 25 wherein the compressive plastic in the moulding gate is flush with the perimeter wall of the end portion.

27. A base portion according to any one of paragraphs 24 to 26 further comprising at least one contact gasket formed of the compressible plastic, the at least one contact gasket lining a respective at least one aperture formed in the end portion of the vaporiser support.

28. An aerosol delivery component comprising a base portion according to any one of paragraphs 24 to 27, wherein the perimeter gasket is sealed against the inner surface of a tank housing.

29. A component according to paragraph 28 further comprising a vaporiser having a wick with a coiled heating element mounted on a support portion of the vaporiser support.

30. A component according to paragraph 28 or 29 wherein the component is a smoking substitute component.

What is claimed is:

1. An aerosol generating apparatus including a body and a consumable, wherein one of the body or a second member includes a push-push insertion member and the other of the body or second member includes a push-push receiving member, wherein the push-push insertion member is receivable by the push-push receiving member to engage the consumable with the body, wherein the consumable is electrically connected to the body when the consumable is engaged with the body, wherein the push-push receiving member and push-push insertion member comprise cooperating electrical contacts, wherein the push-push insertion member is configured to move relative to the push-push receiving member to move along a first path, a second path, a third path, and a fourth path, the first path being arranged at least partially in a first direction, the second path being arranged at least partially in a second direction that is opposed to the first direction, the first and second paths being different, the third path being arranged at least partially in the first direction, the fourth path being arranged at least partially in the second direction, the third and fourth paths being different, such that at an end of the second path, the push-push insertion member is prevented from moving further in the second direction, and at the end of the fourth path, the push-push insertion member is released from the push-push receiving member.

2. The aerosol generating apparatus of claim 1, wherein the second member is the consumable.

3. The aerosol generating apparatus of claim 1, wherein the second member is a carrier member that receives and moves with the consumable, and wherein the carrier member includes a gripping means, the gripping means being configured to grip the consumable when the push-push insertion member is received by the push-push receiving member.

4. The aerosol generating apparatus of claim 1, wherein the body comprises a recess for receiving the consumable and the push-push receiving member and push-push insertion member are configured to engage after the consumable is partially inserted into the recess.

5. The aerosol generating apparatus of claim 1, wherein the body comprises a recess for receiving the consumable and the respective push-push receiving member or push-push insertion member is arranged inside the recess.

6. The aerosol generating apparatus of claim 1, wherein the body comprises a recess for receiving the consumable and the recess and consumable have cooperating alignment features.

7. The aerosol generating apparatus of claim 1, wherein a biasing means is arranged to bias the push-push insertion member against movement relative to the push-push receiving member in a push direction.

8. The aerosol generating apparatus of claim 1, wherein the body houses a power supply.

9. A consumable suitable for use with a body in forming an aerosol generating apparatus, wherein the consumable includes one of a push-push insertion member or a push-push receiving member, and the respective member is configured so that the push-push insertion member is receivable by the push-push receiving member to engage the consumable to the body, wherein the consumable is electrically connected to the body when the consumable is engaged with the body, wherein the push-push receiving member and push-push insertion member comprise cooperating electrical contacts, wherein the push-push insertion member is configured to move relative to the push-push receiving member to move along a first path, a second path, a third path, and a fourth path, the first path being arranged at least partially in a first direction, the second path being arranged at least partially in a second direction that is opposed to the first direction, the first and second paths being different, the third path being arranged at least partially in the first direction, the fourth path being arranged at least partially in the second direction, the third and fourth paths being different, such that at an end of the second path, the push-push insertion member is prevented from moving further in the second direction, and at the end of the fourth path, the push-push insertion member is released from the push-push receiving member.

10. A body suitable for use with a consumable in forming an aerosol generating apparatus, wherein the body includes one of a push-push insertion member or a push-push receiving member, and the respective member is configured so that the push-push insertion member is receivable by the push-push receiving member to engage the consumable to the body, wherein the consumable is electrically connected to the body when the consumable is engaged with the body, wherein the push-push receiving member and push-push insertion member comprise cooperating electrical contacts, wherein the push-push insertion member is configured to move relative to the push-push receiving member to move along a first path, a second path, a third path, and a fourth path, the first path being arranged at least partially in a first direction, the second path being arranged at least partially in a second direction that is opposed to the first direction, the first and second paths being different, the third path being arranged at least partially in the first direction, the fourth path being arranged at least partially in the second direction, the third and fourth paths being different, such that at an end of the second path, the push-push insertion member is prevented from moving further in the second direction, and at the end of the fourth path, the push-push insertion member is released from the push-push receiving member.

* * * * *